United States Patent
Su et al.

(10) Patent No.: US 10,826,636 B2
(45) Date of Patent: Nov. 3, 2020

(54) OPTICAL SUPERVISORY CHANNEL PROCESSING METHOD AND APPARATUS IN OPTICAL NETWORK

(71) Applicant: Huawei Technologies Co., Ltd., Shenzhen (CN)

(72) Inventors: Wei Su, Chengdu (CN); Yujie Chen, Dongguan (CN); Maarten Petrus Joseph Vissers, Amsterdam (NL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/741,121

(22) Filed: Jan. 13, 2020

(65) Prior Publication Data

US 2020/0153529 A1    May 14, 2020

Related U.S. Application Data

(63) Continuation of application No. PCT/CN2018/080303, filed on Mar. 23, 2018.

(30) Foreign Application Priority Data

Jul. 14, 2017 (CN) .......................... 2017 1 0577112

(51) Int. Cl.
*H04B 10/00* (2013.01)
*H04J 3/16* (2006.01)
(Continued)

(52) U.S. Cl.
CPC ........ *H04J 3/1652* (2013.01); *H04B 10/0773* (2013.01); *H04B 10/0775* (2013.01); *H04J 3/1611* (2013.01); *H04J 14/0227* (2013.01)

(58) Field of Classification Search
None
See application file for complete search history.

(56) References Cited

U.S. PATENT DOCUMENTS 7,471,898 B2   12/2008 Shin et al.
2009/0190595 A1   7/2009 Jiang et al.
(Continued)

FOREIGN PATENT DOCUMENTS

CN   101227450 A   7/2008
CN   101959083 A   1/2011
(Continued)

OTHER PUBLICATIONS

McGuire, A., "Content and Format of the OTS-SU," XP017474585, Oct. 12, 1998, pp. 1-4.
(Continued)

*Primary Examiner* — Daniel G Dobson
(74) *Attorney, Agent, or Firm* — Conley Rose, P.C.

(57) ABSTRACT

An overhead processing technology in an optical network and an overheads processing method, including: generating, by a network device, an optical supervisory channel (OSC) frame, where the OSC frame includes a plurality of overhead code block units, each of the plurality of overhead code block units bears an overhead of one type, the OSC frame carries overhead identification information, the overhead identification information is used to identify overhead types of overheads born by the plurality of overhead code block units, and overheads include an optical transmission section overhead, an optical multiplex section overhead, and an optical tributary signal assembly overhead; and sending, by the network device, the OSC frame.

20 Claims, 18 Drawing Sheets

(51) Int. Cl.
H04B 10/077 (2013.01)
H04J 14/02 (2006.01)
H04J 14/00 (2006.01)

(56) References Cited

U.S. PATENT DOCUMENTS

2016/0037242 A1* 2/2016 Su .................. H04J 14/025
                                                    398/45
2019/0045282 A1* 2/2019 Yin ................. H04Q 11/0066

FOREIGN PATENT DOCUMENTS

CN     103825751 A    5/2014
WO     2010121512 A1  10/2010

OTHER PUBLICATIONS

"ITU-T-Draft Recommendation G.709, Network Node Interface for the Optical Transport Network (OTN)," XP017501737, Jan. 15, 2001, pp. 1-28.
Shin, J., "Optical Supervisory Channel Subsystem for 1.6T WDM Transmission System," XP032444630, Feb. 9, 2004, pp. 402-404.
Huawei Tecnologies, et al., "OSC Requirement Proposal," XP044214458, Feb. 13, 2017, 4 pages.
Machine Translation and Abstract of Chinese Publication No. CN101959083, Jan. 26, 2011, 59 pages.
Machine Translation and Abstract of Chinese Publication No. CN103825751, May 28, 2014, 35 pages.
Machine Translation and Abstract of International Publication No. WO2010121512, Oct. 28, 2010, 17 pages.

* cited by examiner

| Bit 65 | ... | 10 | 9 ... 2 | 1 0 |
|---|---|---|---|---|
| | | | BU_TYPE | SyncHD = 01 |
| CRC8 | | | | SyncHD = 01 |

FIG. 5

| | 4 × 66B or 66B | 4 × 66B or 66B | y × 66B | 2 × 66B | OTS OH | OMS OH | OTSiA#i OH | Payload (2552 − y) × 66B or (638 − y) × 66B | ... | 2 × 66B | OTSiA#j OH |
|---|---|---|---|---|---|---|---|---|---|---|---|
| $i^{th}$ frame | AM | OH | MAP | | | | | | | | |
| $(i+1)^{th}$ frame | AM | OH | MAP | | | | OTSiA#m OH | Payload (2552 − y) × 66B or (638 − y) × 66B | ... | 2 × 66B | OTSiA#n OH |

An OSC frame 2560 × 66B or 640 × 66B

FIG. 12

OPTICAL SUPERVISORY CHANNEL PROCESSING METHOD AND APPARATUS IN OPTICAL NETWORK

CROSS-REFERENCE TO RELATED APPLICATIONS

This application is a continuation of International Patent Application No. PCT/CN2018/080303, filed on Mar. 23, 2018, which claims priority to Chinese Patent Application No. 201710577112.7, filed on Jul. 14, 2017. The disclosures of the aforementioned applications are hereby incorporated by reference in their entireties.

TECHNICAL FIELD

Embodiments of the present disclosure relate to the field of optical communications, and in particular, to an overhead processing technology in an optical network.

BACKGROUND

As a core technology of a next generation transport network, an optical transport network (OTN) has an abundant operation, administration, and maintenance (OAM) capability, a strong tandem connection monitoring (TCM) capability, and a strong out-of-band forward error correction (FEC) capability, and can implement flexible scheduling and management of a large-capacity service. An optical supervisory channel (OSC) is used to transmit OAM related information and protection related information in the OTN. The OAM related information and the protection related information are also usually referred to as overheads.

The OTN has characteristics of high bandwidth and a low latency, and therefore becomes an ideal transmission manner for many emerging services such as 4K/8K video and virtual reality. As new services are emerging, network traffic is also increasing. As a result, the OTN is continuously expanded, and network maintenance and management become increasingly challenging. As a major means of transmitting OAM information and protection information, the OSC also has many disadvantages. A relatively large delay exists in a current encapsulation manner. In an example in which the OSC is encapsulated using an Ethernet frame, an intermediate node needs to extract and parse all overhead information included in the Ethernet frame, and then reprocess the overhead information and encapsulate the overhead information in a new payload area. Currently, in this practice, a processing period of the OSC is excessively long, and a relatively large processing delay is caused. In addition, it is not easy to perform expansion in the current encapsulation manner, and the current encapsulation manner has poor compatibility, and cannot meet a requirement of a future large-scale network for the OSC.

Therefore, there is a need for an OSC processing technology, to overcome the foregoing disadvantages that the OSC currently has.

SUMMARY

Embodiments of the present disclosure describe an OSC processing method and apparatus, in order to improve OSC performance in an OTN network.

According to a first aspect, an embodiment of the present disclosure provides an overhead (OH) processing method in an optical transport network, and the method includes: generating an optical supervisory channel (OSC) frame, where the OSC frame includes a plurality of overhead code block units, each of the plurality of overhead code block units bears an overhead of one type, the OSC frame carries overhead identification information, and the overhead identification information is used to identify overhead types of overheads born by the plurality of overhead code block units; and sending the OSC frame.

It should be noted that, the overheads include an optical transmission section (OTS) overhead (OTS OH), an optical multiplex section (OMS) overhead (OMS OH), and an optical tributary signal assembly (OTSiA) overhead (OTSiA OH). Optionally, the overheads further include one or more of an optical channel (OCh) overhead (OCh OH), an optical transmission section data communication channel (OTS_DCC), or an optical multiplex section data communication channel (OMS_DCC). It should be further noted that, one OSC frame includes an overhead area and a payload area, and the plurality of overhead code block units are located in the payload area of the OSC frame.

In a possible implementation, the overhead identification information is located in the overhead area of the OSC frame, and the overhead identification information includes location information of at least one of the plurality of overhead code block units in the payload area of the OSC frame and overhead type information of an overhead born by the at least one overhead code block unit.

In another possible implementation, the overhead identification information is located in at least one of the plurality of overhead code block units, and the overhead identification information is used to indicate an overhead type of an overhead born by each of the least one overhead code block unit.

In a possible design, generating an OSC frame may include: encapsulating the OTS OH, the OMS OH, and the OTSiA OH in the plurality of overhead code block units; and mapping the plurality of overhead code block units to the payload area of the OSC frame. Mapping the plurality of overhead code block units to the payload area of the OSC frame includes: mapping some of the plurality of overhead code block units to a preset location in the payload area of the OSC frame; and mapping the other overhead code block units to any idle location in the payload area of the OSC frame; or mapping the plurality of overhead code block units to any idle location in the payload area of the OSC frame.

In a possible design, each of the plurality of overhead code block units includes at least two 66B data code blocks.

According to a second aspect, an embodiment of the present disclosure provides a network device in an optical network, and the network device is configured to implement a function according to the first aspect. The function may be implemented using hardware, or implemented by executing corresponding software by hardware. The hardware or the software includes one or more modules corresponding to the function.

In a possible design, the network device includes a processor and a transmitter. The processor is configured to support the network device in performing a corresponding function, for example, generating an OSC frame, according to the method described in the first aspect. The transmitter is configured to support the network device in performing a sending action described in the first aspect.

According to a third aspect, an embodiment of the present disclosure provides another overhead processing method in an optical transport network, and the method includes: receiving, by a network device, a first optical supervisory channel (OSC) frame, where the first OSC frame includes a plurality of overhead code block units, each of the plurality of overhead code block units bears an overhead of one type, the first OSC frame carries overhead identification information, and the overhead identification information is used to identify overhead types of overheads born by the plurality of overhead code block units; identifying, from the first OSC frame based on the overhead identification information, a first overhead code block unit that bears a first OTS OH; extracting the first OTS OH from the first overhead code block unit; generating a second OSC frame, where the second OSC frame includes a second overhead code block unit that bears a second OTS OH, and overhead code block units in the first OSC frame that bear an OMS OH and an OTSiA OH; and sending the second OSC frame.

It should be noted that, the overheads include the first optical transmission section overhead (OTS OH), the optical multiplex section overhead (OMS OH), and the optical tributary signal assembly overhead (OTSiA OH). Optionally, the overheads further include one or more of an optical channel overhead (OCh OH), an optical transmission section data communication channel (OTS_DCC), or an optical multiplex section data communication channel (OMS_DCC). The first OTS OH is used to implement operation, administration, and maintenance (OAM) of a transmission section between the network device and an upstream network device adjacent to the network device. The second OTS OH is used to implement OAM of a transmission section between the network device and a downstream network device adjacent to the network device. It should be further noted that, one OSC frame includes an overhead area and a payload area, and the plurality of overhead code block units are located in the payload area of the first OSC frame.

In a possible design, the overhead identification information is located in the overhead area of the first OSC frame, and the overhead identification information includes location information of at least one of the plurality of overhead code block units in the payload area of the first OSC frame and overhead type information of an overhead born by the at least one overhead code block unit.

In another possible design, the overhead identification information is located in at least one of the plurality of overhead code block units included in the first OSC frame, and the overhead identification information is used to indicate an overhead type of an overhead born by each of the least one overhead code block unit.

In a possible design, each of the plurality of overhead code block units includes at least two 66B data code blocks.

In a possible design, generating a second OSC frame includes: generating the second OTS OH and encapsulating the second OTS OH in the second overhead code block unit; and mapping the second overhead code block unit and the overhead code block units in the first OSC frame that bear the OMS OH and the OTSiA OH to a payload area of the second OSC frame. Mapping the second overhead code block unit and the overhead code block units in the first OSC frame that bear the OMS OH and the OTSiA OH to a payload area of the second OSC frame includes: mapping the second overhead code block unit, and some of the overhead code block units in the first OSC frame that bear the OMS OH and the OTSiA OH to a preset location in the payload area of the second OSC frame, and mapping the other overhead code block units to any idle location in the payload area of the second OSC frame; or mapping the second overhead code block unit, and the overhead code block units in the first OSC frame that bear the OMS OH and the OTSiA OH to any idle location in the payload area of the second OSC frame.

According to a fourth aspect, an embodiment of the present disclosure provides another network device in an optical network, and the network device is configured to implement a function according to the third aspect. The function may be implemented using hardware, or implemented by executing corresponding software by hardware. The hardware or the software includes one or more modules corresponding to the function.

In a possible design, the network device includes a receiver, a processor, and a transmitter. The receiver is configured to perform a receiving action in the third aspect. The processor is configured to support the network device in performing a corresponding function, for example, generating a second OSC frame, according to the method described in the third aspect. The transmitter is configured to support the network device in performing a sending action described in the third aspect.

According to a fifth aspect, an embodiment of the present disclosure provides still another overhead processing method in an optical transport network, and the method includes: receiving, by a network device, a first optical supervisory channel (OSC) frame, where the first OSC frame includes a plurality of overhead code block units, each of the plurality of overhead code block units bears an overhead of one type, the first OSC frame carries overhead identification information, and the overhead identification information is used to identify overhead types of overheads born by the plurality of overhead code block units; identifying, from the first OSC frame based on the overhead identification information, a first overhead code block unit that bears a first OTS OH and a second overhead code block unit that bears a first OMS OH; extracting the first OTS OH and the first OMS OH from the first overhead code block unit and the second overhead code block unit respectively; generating a second OSC frame, where the second OSC frame includes a third overhead code block unit that bears a second OTS OH, a fourth overhead code block unit that bears a second OMS OH, and overhead code block units in the first OSC frame that bear the OTSiA OHs; and sending the second OSC frame.

It should be noted that, the overheads include the first optical transmission section overhead (OTS OH), the first optical multiplex section overhead (OMS OH), and the optical tributary signal assembly overheads (OTSiA OHs). Optionally, the overheads further include one or more of an optical channel overhead (OCh OH), an optical transmission section data communication channel (OTS_DCC), or an optical multiplex section data communication channel (OMS_DCC). The first OTS OH is used to implement operation, administration, and maintenance (OAM) of a transmission section between the network device and an upstream network device adjacent to the network device, the first OMS OH is used to implement OAM of a multiplex section between the network device and a first network device having an optical multiplexing function that is upstream of the network device, and there are no other network devices having a multiplex section function between the first network device and the network device. The second OTS OH is used to implement OAM of a transmission section between the network device and a downstream network device adjacent to the network device, the second OMS OH is used to implement OAM of a multiplex section between the network device and a second network device having an optical multiplex section function that is downstream of the network device, and there are no other network devices having an optical multiplexing function between the network device and the second network device. It should be further noted that, one OSC frame includes an overhead area and a payload area, and the plurality of overhead code block units are located in the payload area of the first OSC frame.

In a possible design, the overhead identification information is located in the overhead area of the first OSC frame, and the overhead identification information includes location information of at least one of the plurality of overhead code block units in the payload area of the first OSC frame and overhead type information of an overhead born by the at least one overhead code block unit.

In another possible design, the overhead identification information is located in at least one of the plurality of overhead code block units included in the first OSC frame, and the overhead identification information is used to indicate an overhead type of an overhead born by each of the least one overhead code block unit.

In a possible design, each of the plurality of overhead code block units includes at least two 66B data code blocks.

In a possible design, generating a second OSC frame includes: generating the second OTS OH and encapsulating the second OTS OH in the third overhead code block unit; generating the second OMS OH and encapsulating the second OMS OH in the fourth overhead code block unit; and mapping the third overhead code block unit, the fourth overhead code block unit, and the overhead code block units in the first OSC frame that bear the OTSiA OHs to a payload area of the second OSC frame. Mapping the third overhead code block unit, the fourth overhead code block unit, and the overhead code block units in the first OSC frame that bear the OTSiA OHs to a payload area of the second OSC frame includes: mapping the third overhead code block unit, the fourth overhead code block unit, and some of the overhead code block units in the first OSC frame that bear the OTSiA OHs to a preset location in the payload area of the second OSC frame; and mapping the other overhead code block units to any idle location in the payload area of the second OSC frame; or mapping the third overhead code block unit, the fourth overhead code block unit, and the overhead code block units in the first OSC frame that bear the OTSiA OHs to any idle location in the payload area of the second OSC frame.

According to a sixth aspect, an embodiment of the present disclosure provides still another network device in an optical network, and the network device is configured to implement a function according to the fifth aspect. The function may be implemented using hardware, or implemented by executing corresponding software by hardware. The hardware or the software includes one or more modules corresponding to the function.

In a possible design, the network device includes a receiver, a processor, and a transmitter. The receiver is configured to perform a receiving action in the fifth aspect. The processor is configured to support the network device in performing a corresponding function, for example, generating a second OSC frame and extracting a first OTS OH, according to the method described in the fifth aspect. The transmitter is configured to support the network device in performing a sending action described in the fifth aspect.

According to a seventh aspect, an embodiment of the present disclosure provides yet another overhead processing method in an optical transport network, and the method includes: receiving an OSC frame, where the OSC frame includes a plurality of overhead code block units, each of the plurality of overhead code block units bears an overhead of one type, the OSC frame carries overhead identification information, and the overhead identification information is used to identify overhead types of overheads born by the plurality of overhead code block units; identifying, from the OSC frame based on the overhead identification information, an overhead type of the overhead born by each of the plurality of overhead code block units; and extracting the overhead from each overhead code block unit based on the overhead type of the overhead born by each overhead code block unit.

It should be noted that, the overheads include an optical transmission section overhead (OTS OH), an optical multiplex section overhead (OMS OH), and an optical tributary signal assembly overhead (OTSiA OH). Optionally, the overheads further include one or more of an optical channel overhead (OCh OH), an optical transmission section data communication channel (OTS_DCC), or an optical multiplex section data communication channel (OMS_DCC). It should be further noted that, one OSC frame includes an overhead area and a payload area, and the plurality of overhead code block units are located in the payload area of the OSC frame.

In a possible implementation, the overhead identification information is located in the overhead area of the OSC frame, and the overhead identification information includes location information of at least one of the plurality of overhead code block units in the payload area of the OSC frame and overhead type information of an overhead born by the at least one overhead code block unit.

In another possible implementation, the overhead identification information is located in at least one of the plurality of overhead code block units, and the overhead identification information is used to indicate an overhead type of an overhead born by each of the least one overhead code block unit.

In a possible design, each of the plurality of overhead code block units includes at least two 66B data code blocks.

According to an eighth aspect, an embodiment of the present disclosure provides yet another network device in an optical network, and the network device is configured to implement a function according to the seventh aspect. The function may be implemented using hardware, or implemented by executing corresponding software by hardware. The hardware or the software includes one or more modules corresponding to the function.

In a possible design, the network device includes a receiver, and a processor. The receiver is configured to perform a receiving action in the seventh aspect. The processor is configured to support the network device in performing a corresponding function, for example, extracting an overhead, according to the method described in the seventh aspect.

It should be noted that, in the first aspect to the eighth aspect, the overhead identification information may also be preset location information. Optionally, the OSC frame may further include forward error correction (FEC) information. In the method described in the first aspect, FEC information needs to be further added. In the methods described in the third aspect, the fifth aspect, and the seventh aspect, FEC check needs to be further performed on the received OSC frame. In the first aspect to the eighth aspect, the OSC frame includes an OSC frame alignment marker code block and an OSC frame overhead code block, the OSC frame overhead code block is used to carry operation, administration, and maintenance (OAM) information of the OSC frame, and the OSC frame alignment marker code block is used to identify the OSC frame.

According to a ninth aspect, an embodiment of the present disclosure provides an optical network system, and the system includes the network device according to the second aspect, the network device according to the fourth aspect, and the network device according to the eighth aspect; or the system includes the network device according to the second aspect and the network device according to the eighth aspect; or the system includes the network device according to the second aspect, the network device according to the fourth aspect, the network device according to the sixth aspect, and the network device according to the eighth aspect; or the system includes the network device according to the second aspect, the network device according to the sixth aspect, and the network device according to the eighth aspect.

Compared with other approaches, in solutions provided in the present disclosure, different overheads may be separately born using one OSC frame format, such that processing of overheads by the network device is simplified, and an overhead processing delay is reduced. In addition, an overhead processing technology provided in the present disclosure provides flexible encapsulation and mapping manners that have good expansibility.

BRIEF DESCRIPTION OF DRAWINGS

The following describes the embodiments of the present disclosure in more details with reference to accompanying drawings.

FIG. 5 is a schematic diagram of a possible structure of an overhead code block unit;

FIG. 12 is a schematic diagram of a possible structure of an OSC frame that includes floating mapping indication information;

DESCRIPTION OF EMBODIMENTS

A network architecture and a service scenario that are described in the embodiments of the present disclosure are intended to describe technical solutions of the embodiments of the present disclosure more clearly, and do not constitute a limitation on the technical solutions provided in the embodiments of the present disclosure. Persons of ordinary skill in the art may be aware that, as network architectures evolve and new service scenarios emerge, the technical solutions provided in the embodiments of the present disclosure are also applicable to similar technical problems.

Figure 1:
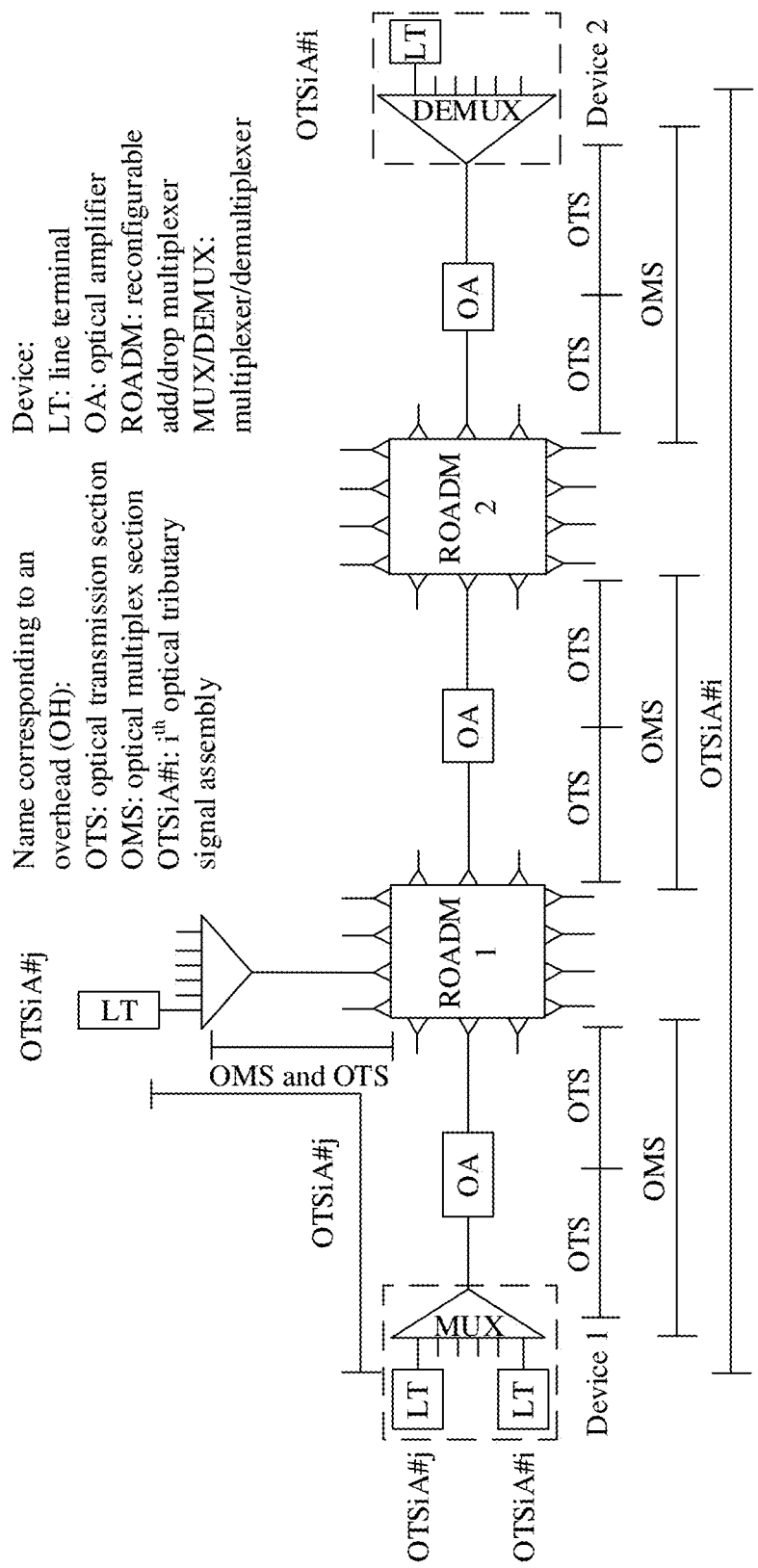
FIG. 1 is a schematic diagram of a possible application scenario according to an embodiment of the present disclosure.

General Overview:

The embodiments of the present disclosure are applicable to an optical network, for example, an optical transport network (OTN). As shown in FIG. 1, one OTN may include different types of devices such as a line terminal (LT), an optical amplifier (OA), and an optical add-drop multiplexer (OADM). Sometimes the LT is also referred to as an optical transport module (OTM), and is configured to modulate an electrical signal into a preset optical signal (wavelength) or demodulate an electrical signal from a specific optical signal. The OA may also be referred to as an optical line amplifier (OLA), and is mainly configured to amplify an optical signal, to support a longer transmission distance while specific performance of the optical signal is ensured. The OADM is configured to perform space conversion on an optical signal, such that the optical signal may be output from different output ports (which are also referred to as directions sometimes). Based on different capabilities, OADMs may be classified into a fixed OADM (FOADM), a reconfigurable OADM (ROADM), and the like. Generally, a plurality of LTs and a multiplexer/demultiplexer are combined into one device, for example, a device 1 in FIG. 1.

To facilitate network management, the OTN is divided into different layers. As shown in FIG. 1, the OTN includes an optical transmission section (OTS), an optical multiplex section (OMS), an optical tributary signal assembly (OTSiA), and the like. To implement effective operation, administration, and maintenance of different sections, diversified overheads (OH) are defined for the OTN. The overheads are used to transfer OAM information and/or protection information of different layers respectively, and optical layer overheads are all transferred through an optical supervisory channel OSC). For example, an OTS overhead (hereinafter referred to as OTS OH) is used to implement operation, administration, and maintenance between two adjacent optical transmission devices. For example, in FIG. 1, a section between the device 1 and an OA device adjacent to the device 1 is considered as a transmission section. For examples of parameters that may be included in the overhead and meanings of the parameters, refer to Table 4, and details are not described herein. For another example, an OMS overhead (hereinafter referred to as OMS OH) is used to implement operation, administration, and maintenance between two adjacent devices having an optical multiplexing function (refer to the related example in FIG. 1). For still another example, an OTSiA overhead (hereinafter referred to as OTSiA OH) is used to implement operation, administration, and maintenance of one or more optical signals transmitted between two devices. One of the two devices is a source node device for transmitting the optical signal, and the other is a destination node (which is also referred to as a sink node) for transmitting the optical signal. For example, the device 1 and a device 2 in FIG. 1.

As shown in FIG. 1, different devices may support different OTN layers. Correspondingly, different OTN devices need to process overheads of different types or different quantities of overheads. For example, in FIG. 1, the device 1 needs to process overheads of the three types mentioned above: an OTS OH, an OMS OH, and an OTSiA OH while an OA device needs to process only an OTS OH. For another example, an ROADM device needs to process only an OTS OH and an OMS OH.

It should be noted that, an optical channel (OCh) is a type of optical signal or a layer defined earlier by the International Telecommunication Union-Telecommunication Standardization Sector (ITU-T) for a single carrier, and an overhead corresponding to the signal or layer is an OCh OH (optical channel overhead). The OTSiA mentioned above is a type of optical signal or a layer recently defined by the ITU-T for multiple carriers, and an overhead corresponding to the signal or layer is an OTSiA OH. Only one of the two types of signals may appear or both types of signals may appear. This is not limited in this embodiment of the present disclosure.

An encapsulation manner in which an Ethernet frame or optical data unit (ODU) frame is used is mainly used for a current OSC. Manufacturers support different manners, causing poor interworking. Second, a processing delay is relatively large in a current manner. For example, when an Ethernet frame is used to bear overheads, an intermediate node needs to extract and parse all overhead information in a payload area of the Ethernet frame, and reprocess the overhead information and encapsulate the overhead information in a new payload area. A processing period is excessively long, and a relatively large processing delay is caused. Third, a fixed bandwidth allocation manner is used in the current encapsulation manner. It is not easy to perform expansion in this manner, and this manner has low bandwidth utilization and poor compatibility, and cannot meet a requirement of a future large-scale network for the OSC.

A new OSC frame format is defined in the embodiments of the present disclosure. OTN devices may use this uniform OSC frame format, to resolve a problem of interworking and improve interoperability of the devices. This OSC frame comprises a plurality of 66B code blocks (namely, one data block whose length is 66 bits), and includes an overhead area and a payload area. The overhead area includes an alignment marker (AM) code block and an overhead OH code block. An OSC frame overhead code block is used to carry operation, administration, and maintenance (OAM) information of the OSC frame, and an OSC frame alignment marker code block is used to identify the OSC frame. The payload area of the OSC frame includes a series of data code blocks for bearing optical layer overheads.

The following describes a structure of the OSC frame defined in the embodiments of the present disclosure in detail with reference to more accompanying drawings.

Figure 2:
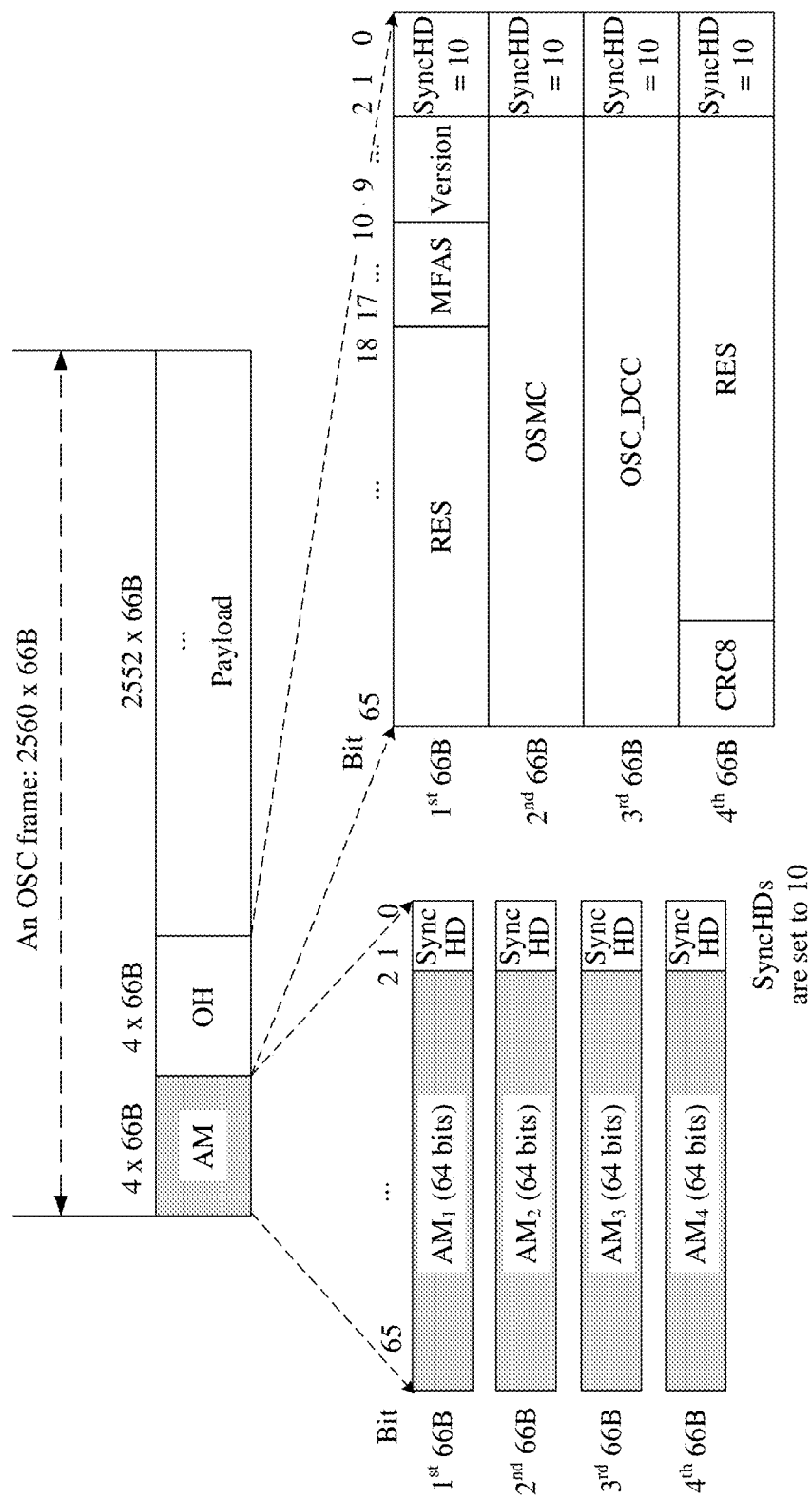
FIG. 2 is a schematic diagram of a possible structure of an OSC frame.

FIG. 2 is a schematic diagram of a possible structure of an OSC frame. The OSC frame comprises 2560 66B code blocks. In FIG. 2, an AM code block (having a length of four 66B code blocks) and an OH code block (having a length of four 66B code blocks) that are included in the OSC frame are further described. Parameters included in the two code blocks are described in Table 1. It should be noted that, the parameters in Table 1 are merely an example of a possible implementation, and parameters that are actually included in the two code blocks and lengths of the parameters may be different. For example, not only the parameters in Table 1 are included, but also some other parameters are added. Alternatively, only some of the parameters provided in Table 1 are included.

TABLE 1

Information about the parameters included in the AM code block and the OH code block in FIG. 2

| Name of a code block | Name and length of an included parameter | Detailed description |
|---|---|---|
| AM code block | $AM_1$-$AM_4$ (the four AMs are all 64 bits (bits)) | As a frame header indication of the OSC frame, this field is used to identify the OSC frame. As an example, {$CM_0$, $CM_1$, $CM_2$, $UP_0$, $CM_3$, $CM_4$, $CM_5$, $UP_1$} defined in Table 119-1 in the IEEE 802.3bs standard may be used for the four AMs, and specific values are {0x9A, 0x4A, 0x26, 0x05, 0x65, 0xB5, 0xD9, 0xD6}. This field may further use a control character (also referred to as a control code block, or sometimes referred to as a fixed pattern) that is used for alignment and that is defined in another standard. |
| | SyncHD (2 bits) | This field indicates a synchronization header synchronization header, is set to 10, and is used for synchronization. |
| OH code block | SyncHD (2 bits) | This field indicates a synchronization header synchronization header, is set to 10, and is used for synchronization. |
| | Version (8 bits) | This field indicates version information. In a possible implementation, this field may be used to indicate a minimum frequency grid (frequency grid) supported by the current OSC frame, and the minimum frequency grid is represented by different values such as 3.125 GHz, 6.25 GHz, 25 GHz, 37.5 GHz, 75 GHz, or 100 GHz. |
| | MFAS (8 bits) | This field indicates a multi-frame alignment signal multi-frame alignment signal, and is used to indicate location information of the current OSC frame in a multi-frame. For example, the multi-frame has a length of 256 frames. Starting from 0, a value of this field of the OSC frame is incremented by 1 at a time until 255. Then, the value of this field is reset to 0 at the next frame, and a new round of multi-frame indication starts. |
| | OSMC (64 bits) | This field indicates an OTN synchronization message channel, and is used to bear an OTN synchronization message. |
| | OSC_DCC (64 bits) | This field indicates a data communication channel (DCC), and the DCC is used to transmit some other protocol information, for example, user-defined information. |
| | RES (56 bits, 48 bits) | This field is a reserved field, and is usually filled with zero. |
| | CRC8 (8 bits) | This field indicates cyclic redundancy check 8, and is used to detect whether an error exists after data transmission. |

Figure 3:
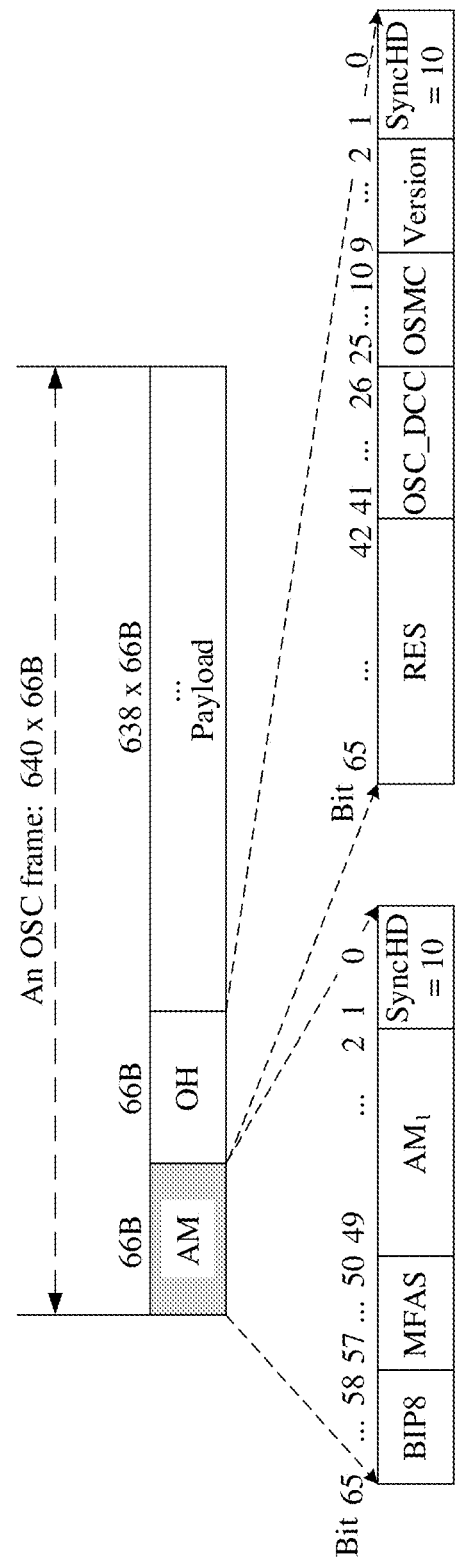
FIG. 3 is a schematic diagram of another possible structure of an OSC frame.

FIG. 3 is a schematic diagram of another possible OSC frame structure. A difference from the OSC frame shown in FIG. 2 is that, the OSC frame shown in FIG. 3 comprises 640 66B code blocks, and a shorter frame period is used. A size of an AM code block and a size of an OH code block each are one 66B code block. In FIG. 3, information included in the AM code block and the OH code block is further described. Parameters included in the two code blocks are described in Table 2. It should be noted that, the parameters in Table 2 are merely an example of a possible implementation, and parameters that are actually included in the two code blocks and lengths of the parameters may be different. For example, not only the parameters in Table 2 are included, but also some other parameters are added. Alternatively, only some of the parameters provided in Table 2 are included. For example, an AM code block of one OSC frame includes an RES field (a reserved field) instead of a BIP8 field.

TABLE 2

Information about the parameters included in the AM code block and the OH code block in FIG. 3

| Name of a code block | Name and length of an included parameter | Detailed description |
|---|---|---|
| AM code block | $AM_1$ (48 bits) | As a frame header indication of the OSC frame, this field is used to identify one OSC frame. Specifically, {0xF6, 0xF6, 0xF6, 0x28, 0x28, 0x28} may be used to fill this field. This field may further use a control character that is used for alignment and that is defined in another standard. |
|  | SyncHD (2 bits) | Refer to the description in Table 1, and details are not described herein. |
|  | MFAS (8 bits) | Refer to the description in Table 1, and details are not described herein. |
|  | BIP8 (8 bits) | This field indicates bit-interleaved parity 8 bit-interleaved parity 8, and is used for data check. For example, a $(i + 2)^{th}$ OSC frame carries bit-interleaved parity 8 information generated by a $i^{th}$ OSC frame. |
| OH code block | SyncHD (2 bits) | Refer to the description in Table 1, and details are not described herein. |
|  | Version (8 bits) | Refer to the description in Table 1, and details are not described herein. |
|  | OSMC (16 bits) | Refer to the description in Table 1, and details are not described herein. |
|  | OSC_DCC (16 bits) | Refer to the description in Table 1, and details are not described herein. |
|  | RES (24 bits) | Refer to the description in Table 1, and details are not described herein. |

Figure 4:
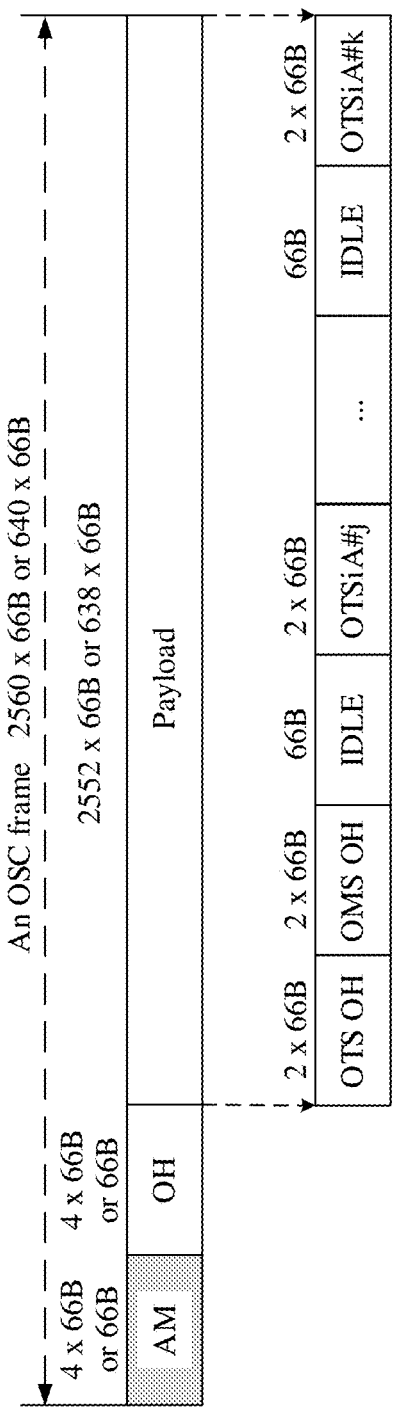
FIG. 4 is a schematic diagram of a possible structure of a payload area of an OSC frame.

Payload areas (Payload) included in the OSC frames are shown in FIG. 2 and FIG. 3, and sizes of the payload areas are 2552 66B code blocks and 638 66B code blocks. Further, FIG. 4 is a schematic diagram of a payload area of an OSC frame. This example is applicable to OSC frames having different lengths, for example, the OSC frames shown in FIG. 2 and FIG. 3. As shown in FIG. 4, the payload area of the OSC frame includes different overhead code block units and an idle code block. The idle code block may be an idle code block (0x1E) defined in IEEE 802.3. For example, different overhead code block units such as an OTS OH code block unit, an OMS OH code block unit, and an OTSiA OH code block unit are mapped to the payload area of the OSC frame in a floating or fixed mapping manner, and rate adaptation is performed using the idle code block. An overhead code block unit of each type occupies at least two consecutive 66B code blocks. Each 66B code block includes a 2-bit synchronization header and 64-bit data. For ease of description, the following uses an example in which a size of each overhead code block is two 66B code blocks. However, in the embodiments of the present disclosure, a size of an overhead code block unit used during actual application is not specifically limited. For example, an overhead code block unit may also be a single 66B code block.

The following further describes the overhead code block unit with reference to FIG. 5. FIG. 5 is a schematic diagram of a possible structure of an overhead code block unit. For example, the overhead code block unit includes the following fields.

SyncHD (2 bits) indicates a synchronization header synchronization header, is set to 01, and is used for synchronization.

BU_TYPE (8 bits) indicates a block unit type code block unit type (hereinafter referred to as a code block unit type indication field). Table 3 shows a list of possible values and corresponding overhead types. It should be noted that, this field is optional. When overheads of different types have a fixed location in a payload area of an OSC frame, for example, an OTS OH code block unit occupies the first 66B code block and the second 66B code block of the payload area of the OSC frame, this field is not required.

CRC8 (8 bits) indicates cyclic redundancy check 8, and is used to detect whether an error exists after data transmission. It should be noted that, this field is optional. If there is no such function, this field may be set as a reserved (RES) field.

TABLE 3

Examples of BU_TYPE values and corresponding overhead types

| BU_TYPE value | Corresponding overhead type | Description |
|---|---|---|
| 0x01 | OTS OH | This overhead is used to implement OAM of a transmission section between a network device and an upstream network device or a downstream network device adjacent to the network device. |
| 0x02 | OMS OH | This overhead is used to implement OAM of a multiplex section between a network device and another network device having a multiplex section function that is upstream or downstream of the network device, and there are no other network devices having a multiplex section function between the network device and the other network device. |
| 0x03 | OTSiA OH | This overhead is used to implement OAM of a multi-carrier optical signal transmitted between a source node device and a destination node device. |

TABLE 3-continued

Examples of BU_TYPE values and corresponding overhead types

| BU_TYPE value | Corresponding overhead type | Description |
|---|---|---|
| 0x04 | OCh OH (Optical Channel Overhead) | This overhead is used to implement OAM of a single-carrier optical signal transmitted between a source node device and a destination node device. |
| 0x05 | OTS_DCC (Optical Transmission Section Data Communication Channel) | This overhead is used to implement data communication of a transmission section between a network device and an upstream network device or a downstream network device adjacent to the network device. |
| 0x06 | OMS_DCC (Optical Multiplex Section Data Communication Channel) | This overhead is used to implement data communication on a multiplex section between a network device having a multiplex section function and another network device having a multiplex section function that is upstream or downstream of the network device, and there are no other network devices having a multiplex section function between the network device and the other network device. |
| 0x07-0xFF | Reserved | / |

Specific field information that is included in another field not marked in FIG. 5 is different based on different BU_TYPE types. The following provides an example of structures of some overheads with reference to specific BU_TYPE types.

Figure 6:
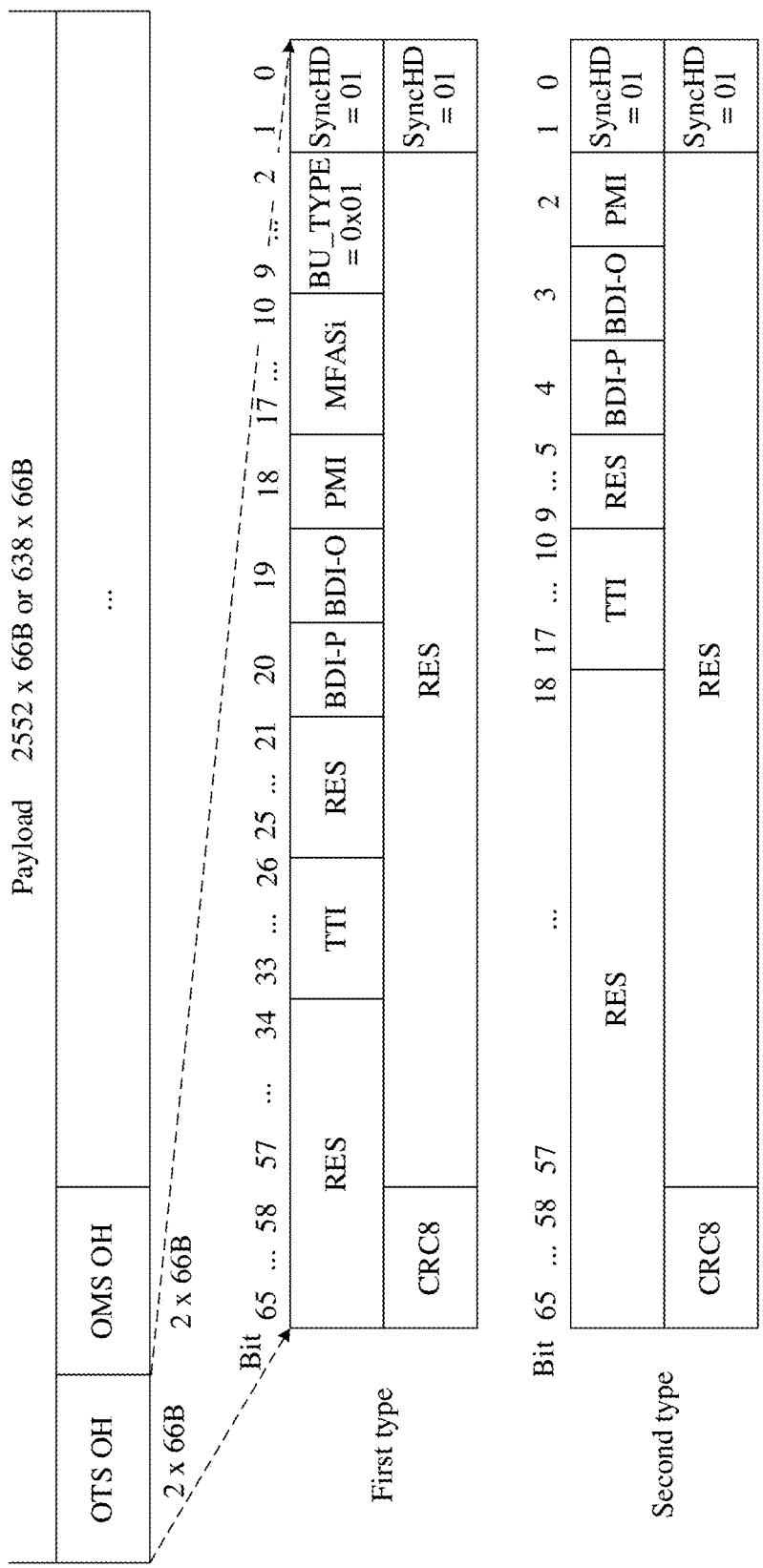
FIG. 6 is a schematic diagram of two possible structures of an OTS OH code block unit.

FIG. 6 is a schematic diagram of two possible structures of an OTS OH code block unit. The OTS OH code block unit is applicable to an OSC frame whose length is 2560×66B, and is also applicable to an OSC frame having another length. A first structure includes a BU_TYPE field, and the BU_TYPE field is used to indicate an overhead type of an overhead born by the overhead code block unit. A second structure is mapped to a preset location in a payload area of an OSC frame in a fixed mapping manner. For example, the OTS OH code block unit occupies the first 66B code block and the second 66B code block in the payload area of the OSC frame, and therefore does not include a BU_TYPE field. A description of each field included in the overhead code block unit is shown in Table 4.

TABLE 4

Description of fields in two possible OTS OH code block units

| Name and size of a field | Description | Remarks |
|---|---|---|
| SyncHD (2 bits) | This field indicates a synchronization header synchronization header, is set to 01, and is used for synchronization. | Both two structures have this field. |
| BU_TYPE (8 bits) | This field indicates a block unit type code block unit type. Table 3 shows a list of possible values and corresponding overhead types. In FIG. 6, this field is set to 0x01, and it indicates that a type is an OTS OH code block unit. | Only a first structure has this field. |
| MFASi (8 bits) | This field indicates a multi-frame alignment signal multi-frame alignment signal, and is used to provide a multi-frame indicator for an overhead code block unit of one type, where the last letter i is used to differentiate this field from the MFAS field (which indicates multi-frame information of an OSC frame) in Table 1, but the two fields are essentially the same, and each are used as a multi-frame indicator. In FIG. 6, MFASi is a dedicated multi-frame indicator of the OTS OH code block unit, and indicates location information of the OTS OH code block unit in a multi-frame. For example, the multi-frame has a length of 256 frames. Starting from 0, a value of MFASi is incremented by 1 at a time until 255, as a quantity of OTS OH code block units increases. Then, the value of MFASi is reset to 0 at the next frame, and a new round of multi-frame indication starts. | Only the first structure has this field. |

TABLE 4-continued

Description of fields in two possible OTS OH code block units

| Name and size of a field | Description | Remarks |
|---|---|---|
| PMI (1 bit) | This field indicates a payload missing indication payload missing indication, and indicates whether a payload is missing on a transmission section. For example, when this field is set to 1, it indicates that a payload is missing; when this field is set to 0, it indicates that a payload is normal. In other words, the payload is not missing. | Both two structures have this field. |
| BDI-O (1 bit) | This field indicates a backward defect indication overhead backward defect indication overhead. | Both two structures have this field. |
| BDI-P (1 bit) | This field indicates a backward defect indication payload backward defect indication payload. | Both two structures have this field. |
| RES (having various lengths) | This field is a reserved field. The two formats each have RES fields having different lengths. For specific length information, refer to FIG. 6. This is not described in detail in this table. | Both two structures have this field. |
| TTI (8 bits) | This field indicates a trail trace identifier trail trace identifier. A TTI in Each OTS OH code block unit occupies 8 bits, and complete information indication of the TTI is implemented using a multi-frame indicator. Specifically, if a floating mapping manner is used, the MFASi field is used; or if a fixed mapping manner is used, an MFAS field in an overhead area of an OSC frame needs to be used. | Both two structures have this field. |
| CRC8 (8 bits) | This field indicates cyclic redundancy check 8, and is used to store cyclic redundancy check information of the current code block unit. | Both two structures have this field. |

Figure 7:
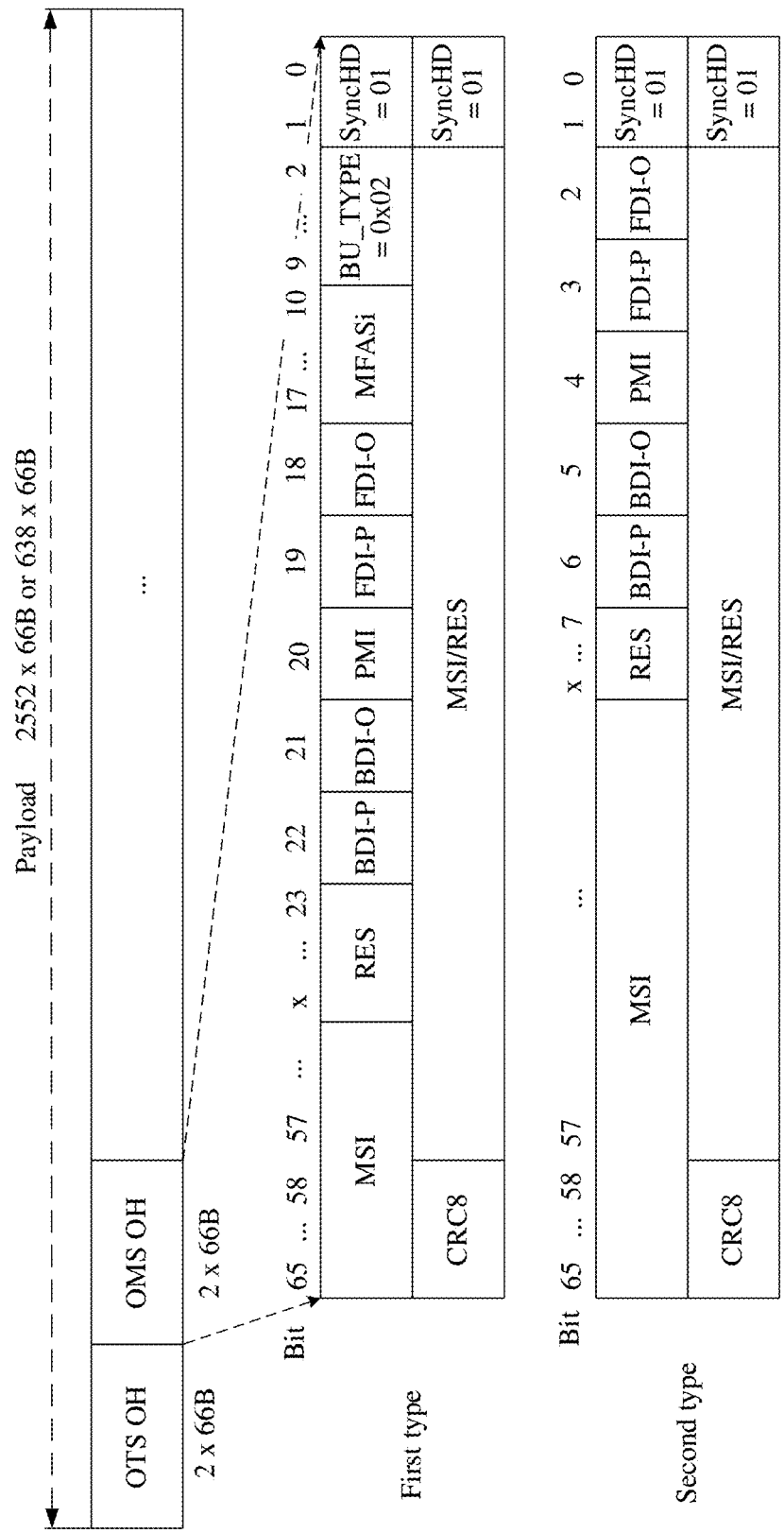
FIG. 7 is a schematic diagram of two possible structures of an OMS OH code block unit.

FIG. 7 is a schematic diagram of two possible structures of an OMS OH code block unit. Similar to an OTS OH code block unit, the OMS OH code block unit is applicable to an OSC frame whose length is 2560×66B, and is also applicable to an OSC frame having another length. A first structure includes a BU_TYPE field, and the BU_TYPE field is used to indicate an overhead type of an overhead born by the overhead code block unit. A second overhead structure is mapped to a specific location in a payload area of an OSC frame in a fixed mapping manner. For example, the OMS OH code block unit occupies the third 66B code block and the fourth 66B code block in the payload area of the OSC frame, and therefore does not include a BU_TYPE field. A description of each field included in the overhead code block unit is shown in Table 5.

TABLE 5

Description of fields in two possible OMS OH code block units

| Name and size of a field | Description | Remarks |
|---|---|---|
| SyncHD (2 bits) | Refer to Table 4, and details are not described herein. | Both two structures have this field. |
| BU_TYPE (8 bits) | For a description, refer to Table 4, and details are not described herein. A difference from Table 4 is that, in FIG. 7, this field is set to 0x02, and it indicates that a type is an OMS OH code block unit. | Only a first structure has this field. |
| MFASi (8 bits) | For a description, refer to Table 4, and details are not described herein. A difference from Table 4 is that, this field is used as a dedicated multi-frame indicator of the OMS OH code block unit. | Only the first structure has this field. |
| FDI-O (1 bit) | This field indicates a forward defect indication overhead forward defect indication overhead. | Both two structures have this field. |
| FDI-P (1 bit) | This field indicates a forward defect indication payload forward defect indication payload. | Both two structures have this field. |

TABLE 5-continued

Description of fields in two possible OMS OH code block units

| Name and size of a field | Description | Remarks |
|---|---|---|
| PMI (1 bit) | This field indicates a payload missing indication payload missing indication, and indicates whether a payload is missing on a multiplex section. | Both two structures have this field. |
| BDI-O (1 bit) | This field indicates a backward defect indication overhead backward defect indication overhead. | Both two structures have this field. |
| BDI-P (1 bit) | This field indicates a backward defect indication payload backward defect indication payload. | Both two structures have this field. |
| RES (having various lengths) | This field is a reserved field. The two structures each have RES fields having different lengths. For specific length information, refer to FIG. 7. This is not described in detail in this table. | Both two structures have this field. |
| MSI (having a variable length) | This field indicates a multiplex structure identifier multiplex structure identifier, and indicates occupancy of an optical spectrum supported by a multiplex section. For details of an MSI structure, refer to FIG. 8 to FIG. 10 and related descriptions. | Both two structures have this field. |
| CRC8 (8 bits) | Refer to Table 4, and details are not described herein. | Both two structures have this field. |

Figure 8:
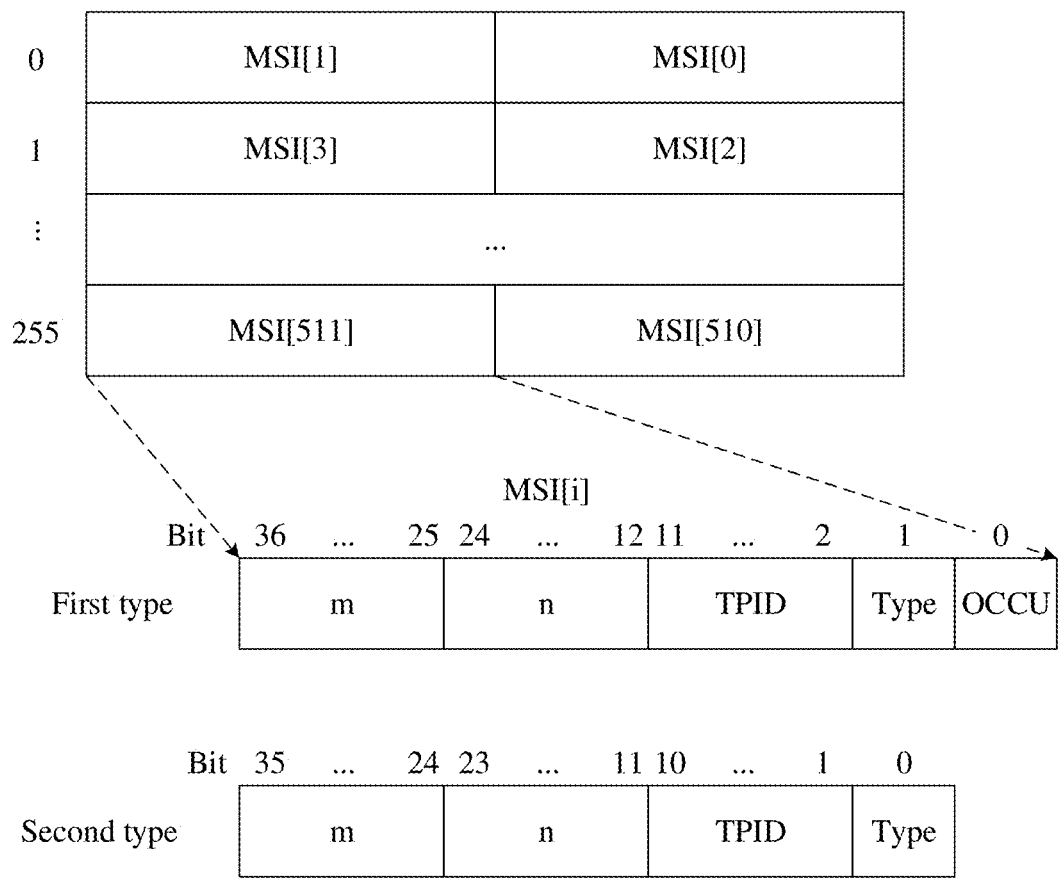
FIG. 8 is a schematic diagram of two possible structures of an MSI.
Figure 9:
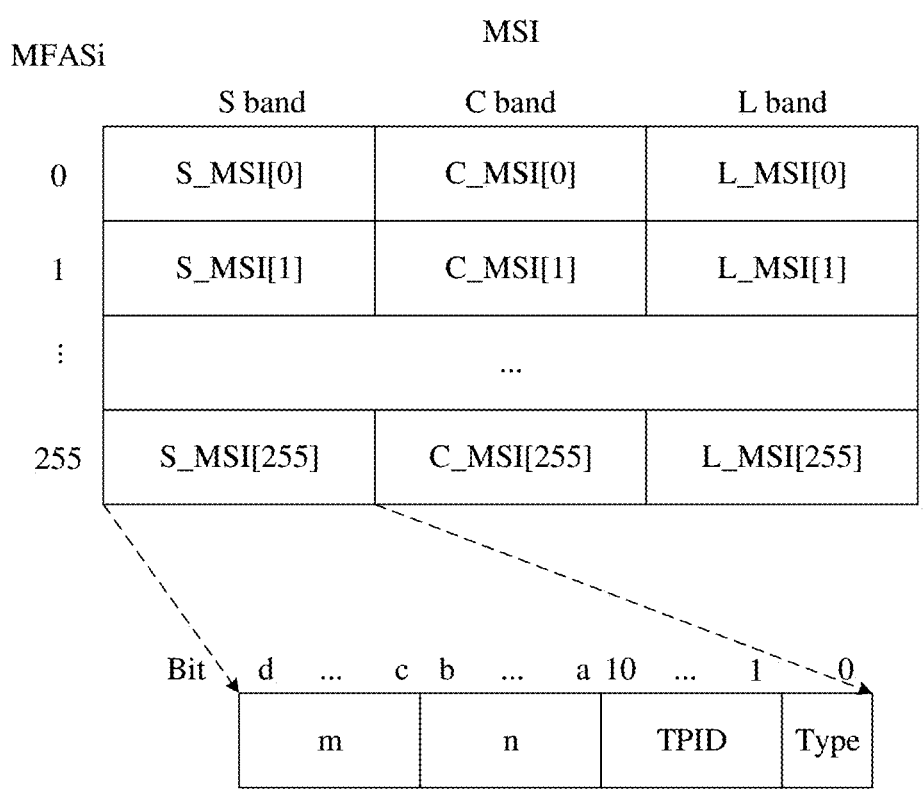
FIG. 9 is a schematic diagram of another possible structure of an MSI.
Figure 10:
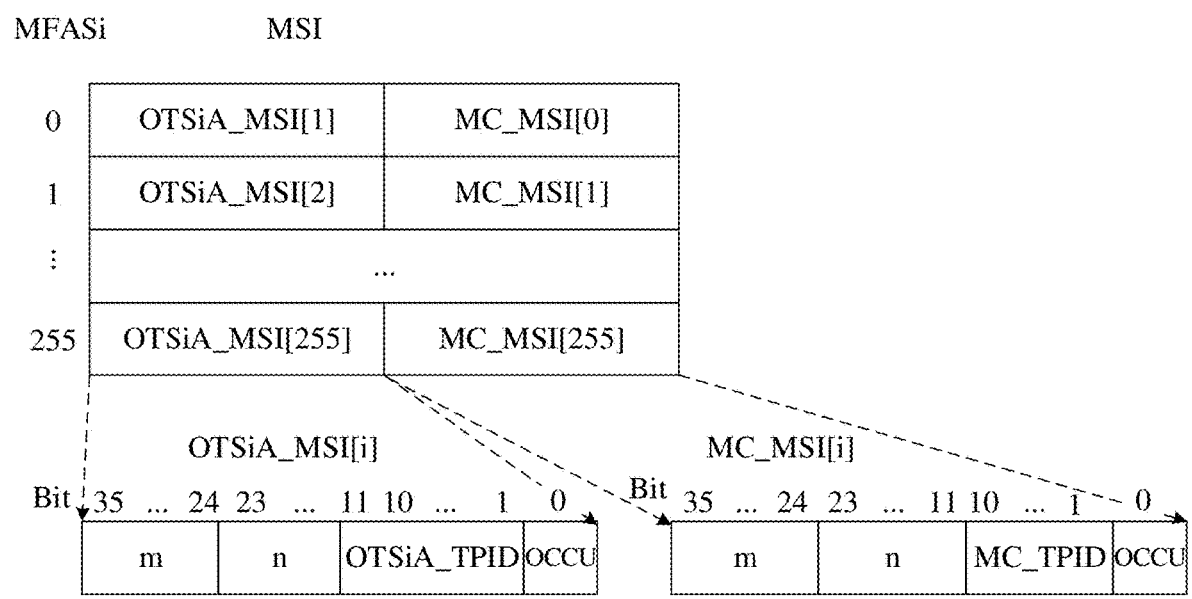
FIG. 10 is a schematic diagram of still another possible structure of an MSI.

The following further explains definition of the MSI with reference to FIG. 8 to FIG. 10.

FIG. 8 is a schematic diagram of two possible structures of an MSI. This structure of the MSI and a dedicated multi-frame indicator field (namely, an MFASi field) of an OMS OH code block unit are used to indicate occupancy of optical spectrum resources of one multiplex section. As shown in FIG. 8, for example, an MSI field included in an OMS OH overhead code block unit in one OSC frame has a length of 74 bits or 72 bits, and the MSI field indicates occupancy of 512 spectrum resources using 256 multi-frames (MFASi=0, 1, . . . , and 255). For descriptions of fields included in the two possible structures of the MSI, refer to Table 6.

TABLE 6

Description of fields included in two possible MSIs

| Name and size of a field | Description | Remarks |
|---|---|---|
| OCCU (1 bit) | This field indicates occupation, namely, an occupation indicator, and indicates whether a current spectrum is occupied. Specifically, 1 may be used to indicate that the current spectrum is occupied, and 0 may be used to indicate that the current spectrum is not occupied. A specific value and meaning are not limited in this embodiment of the present disclosure. | Only a first structure has this field. |
| Type (1 bit) | This field indicates a type indicator. Specifically, 1 may be used to indicate a media channel (media channel), and 0 may be used to indicate a connection (connection) and represent an OTSiA. A specific value and meaning are not limited in this embodiment of the present disclosure. | Both two structures have this field. |
| TPID (10 bits) | This field indicates a tributary port identifier, and is used to indicate tributary port information of the OTSiA or the media channel. A tributary port identifier of the OTSiA or the media channel is separately numbered. For example, a value range is [0, 1023], and a specific range depends on an actual requirement.<br>TPID = 0 may be used to indicate that this spectrum is not occupied. In this way, the OCCU overhead field does not need to be defined. | Both two structures have this field. |
| n (13 bits) | n and m are used to indicate one Frequency Slot. Specifically, n is used to indicate a center frequency of one spectrum, and m is used to indicate a width of the spectrum. | Both two structures have this field. |

TABLE 6-continued

Description of fields included in two possible MSIs

| Name and size of a field | Description | Remarks |
|---|---|---|
| m (12 bits) | The two fields may indicate occupancy of all spectrum resources of an S band, an L band, and a C band. Values of n and m are sequentially placed, according to spectrum sizes, in MSIs with different numbers, for example, MSI[0], MSI[1], . . . , and MSI[255] shown in FIG. 9. | Both two structures have this field. |

It should be noted that, a difference between a first manner and a second manner is that, in the first manner, only an OCCU field is used to indicate an occupied or idle state, while in the second manner, a special TPID value (TPID=0) is used to indicate an idle state of a resource, and another TPID value is used to indicate that a resource has been occupied. Therefore, no additional field is required to indicate that the resource is idle. The second manner reduces more overheads than the first manner.

FIG. 9 is a schematic diagram of another possible structure of an MSI. A difference from the structures shown in FIG. 8 is that, occupancy of resources of different bands is differentiated in the structure of the MSI shown in FIG. 9. To be more specific, different fields are used to indicate the occupancy of the resources of the different bands. A single frame includes S_MSI[x], L_MSI[x], and C_MSI[x], where x=0, 1, . . . , and 255. S_MSI[x], L_MSI[x], and C_MSI[x], and a multi-frame (namely, an MFASi field) are used to completely indicate occupancy of spectrum resources of an S band, an L band, and a C band respectively. For a description of each field, refer to Table 6, and details are not described herein. It should be noted that, a length of the MSI shown in FIG. 9 may be not the same as a length of the MSI shown in FIG. 8. If n is 13 bits and m is 12 bits, for example, the length of the MSI shown in FIG. 9 is 108 bits. Because the three bands are separately represented, specific values of n and m may be less than the foregoing example values. In the structure shown in FIG. 9, lengths of n and m may be selected based on a maximum possible value of each band. The lengths are not limited in this embodiment of the present disclosure, and are only required to indicate occupancy of resources of one band.

FIG. 10 is a schematic diagram of still another possible structure of an MSI. A difference from the structures shown in FIG. 8 is that, a media channel (abbreviated as MC in the figure) and an OTSiA are differentiated in the structure of the MSI to indicate occupancy of resources. Therefore, the type field included in the structures in FIG. 8 is not required in FIG. 10. For example, one OSC frame includes OTSiA_MSI [x] and MC_MSI[x], where x=0, 1, . . . , and 255. OTSiA_MSI[x] and MC_MSI[x] are used to indicate occupancy of spectrum resources of the OTSiA and the media channel respectively. Occupancy of resources of a plurality of OTSiAs and a plurality of media channels is separately indicated using OTSiA_MSI[x] and MC_MSI[x] and a multi-frame (namely, an MFASi field). For a description of each field, refer to Table 6, and details are not described herein. It should be noted that, fields included in the MSI shown in FIG. 10 are not completely the same. MC_TPID and OTSiA_TPID included in FIG. 10 are obtained by further dividing TPID in FIG. 8. To be more specific, the media channel and the OTSiA are indicated using different fields instead of a type field and a TPID field. However, there is no essential difference between meanings of the three fields (the MC_TPID field, the OTSiA_TPID field, and the TPID field).

It should be noted that, in the foregoing four examples of the structures of the MSI, a spectrum band may further be represented in another manner, for example, using <starting center frequency n1, ending center frequency n2>. A specific manner of representing the spectrum band is not limited in this embodiment of the present disclosure.

It should be further noted that, currently, there is no field to indicate a quantity of spectrum bands, and whether indication of occupancy of resources is completed may be determined by analyzing values of n and m included in each MSI. Generally, values of n and m cannot be 0. Therefore, for some fields, if the values of these two fields are 0, it may be determined that the fields have no actual meaning. If resource information is padded to an MSI field in order, when a field in which values of n and m each are 0 is parsed, it may be determined that indication of occupancy information of spectrum resources is completed. Optionally, one field may be further added to the foregoing structures of the MSI to indicate the quantity of spectrum bands, such that processing for MSI information may be simplified. A specific quantity of spectrum bands depends on a band supported by the MSI and actual use. If one multiplex section supports an S band (1460 nm to 1530 nm), a C band (1530 nm to 1565 nm), and an L band (1565 nm to 1625 nm), and an example in which a minimum spectrum granularity (or referred to as a frequency slice) is equal to 3.125 GHz is used, a minimum spectrum band occupies only one spectrum granularity, the S band includes three spectrum bands, the C band includes 1404 spectrum bands, and the L band includes 2264 spectrum bands. Therefore, there are a maximum of 3671 spectrum bands. In actual use, because a plurality of consecutive spectrum bands may usually be combined and therefore considered as one spectrum band, an actual quantity of spectrum bands that one MSI needs to indicate may be greatly reduced.

Figure 11:
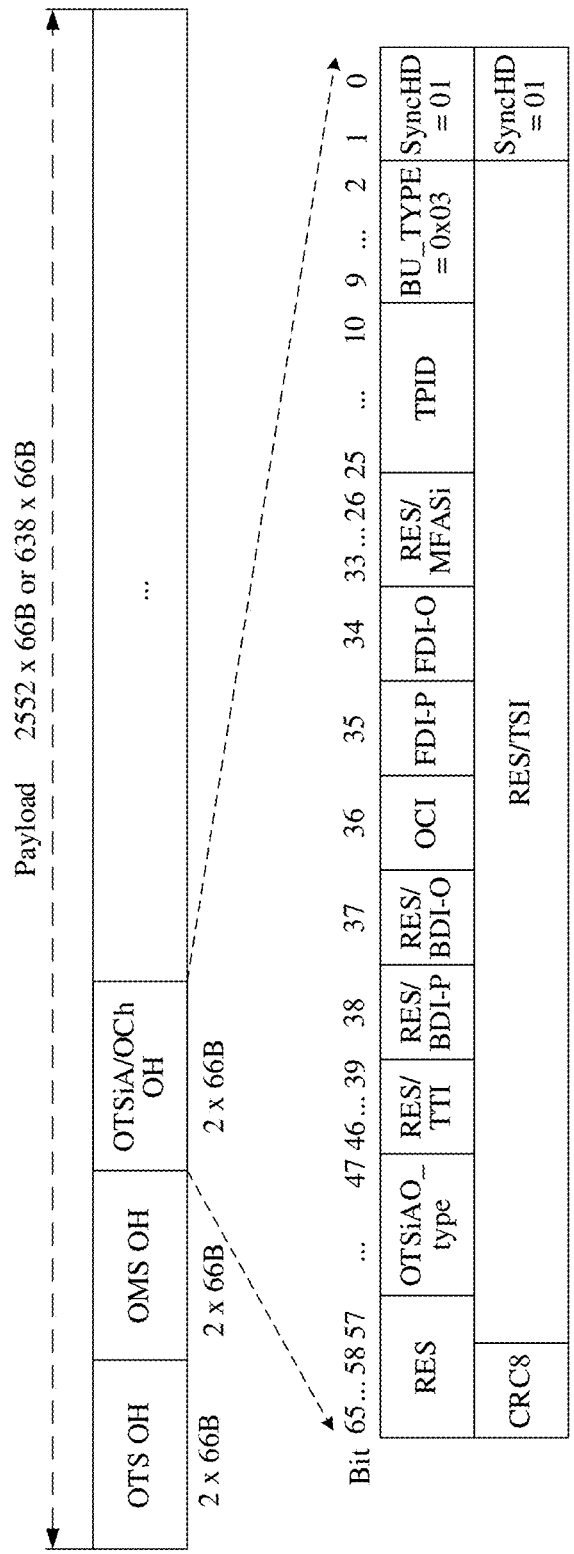
FIG. 11 is a schematic diagram of a possible structure of an OTSiA OH code block unit or an OCh OH code block unit.

FIG. 11 is a schematic diagram of a possible structure of an OCh OH code block unit or an OTSiA OH code block unit. It should be noted that, the structure shown in FIG. 11 may indicate an OCh OH or an OTSiA OH, and the OCh OH and the OTSiA OH are differentiated using an OTSiAO_TYPE field in the structure. For example, OTSiAO_TYPE=1 indicates that a current overhead code block unit bears the OTSiA OH, and OTSiAO_TYPE=0 indicates that a current overhead code block unit bears the OCh OH. For a detailed description of a parameter, refer to Table 7. It should be noted that, the last column of Table 7 specifies whether a field is common to the two different overheads or specific to an overhead.

TABLE 7

Description of fields included in the schematic diagram of the structure in FIG. 11

| Name and size of a field | Description | Remarks |
| --- | --- | --- |
| SyncHD (2 bits) | Refer to Table 4, and details are not described herein. | This field is common to the two overheads. |
| BU_TYPE (8 bits) | For a description, refer to Table 4, and details are not described herein. In FIG. 11, this field is set to 0x03, and it indicates that an overhead type is the OTSiA OH or the Och OH. | This field is common to the two overheads. |
| TPID (10 bits) | For a description, refer to Table 6, and details are not described herein. A difference from Table 6 is that, in FIG. 11, this field indicates that the current OTSiA OH code block unit bears overhead information of an OTSiA. For example, #i indicates that overhead information of an OTSiA#i is currently born. To be specific, a current overhead code block unit is an OTSiA#i OH code block unit. | This field is specific to the OTSiA OH. |
| MFASi (8 bits) | For a description, refer to Table 4, and details are not described herein. A difference from Table 4 is that, this field is used as a dedicated multi-frame indicator of the OTSiA OH code block unit. | This field is specific to the OTSiA OH. |
| FDI-O (1 bit) | For a description, refer to Table 5, and details are not described herein. | This field is common to the two overheads. |
| FDI-P (1 bit) | For a description, refer to Table 5, and details are not described herein. | This field is common to the two overheads. |
| OCI (1 bit) | This field indicates an Open Connection Indication, and is used to indicate whether a cross-connection is configured for a node. For example, a node receives a management command indicating no cross-connection is configured for the node, and an OCI in an OSC frame sent to a downstream node of the node needs to be set to 1 to indicate that no cross-connection is configured. | This field is common to the two overheads. |
| BDI-O (1 bit) | For a description, refer to Table 5, and details are not described herein. | This field is specific to the OTSiA OH. |
| BDI-P | For a description, refer to Table 5, and details are not described herein. | This field is specific to the OTSiA OH. |
| TTI (8 bits) | This field indicates a trail trace identifier trail trace identifier. A TTI in Each OTSiA OH code block unit occupies 8 bits, and complete information indication of the TTI is implemented using a multi-frame indicator MFASi [5:0]. | This field is specific to the OTSiA OH. |
| OTSiA_Type (1 bit) | This field indicates an overhead differentiation indication, and is used to differentiate between the OTSiA OH and the OCh OH. It should be noted that, this field is essentially a field that may indicate an overhead born by one overhead code block unit. | This field is common to the two overheads. |
| RES (having various lengths) | This field is a reserved field. The two overheads each have RES fields having different lengths. For specific length information, refer to FIG. 11. This is not described in detail in this table. | This field is common to the two overheads. |
| TSI (having a variable length) | This field indicates a transmitter structure identifier transmitter structure identifier, and is used to complete indicating configuration information, including but not limited to information such as a bit rate, a baud rate, a wavelength modulation code type, a quantity of subcarriers, FEC, and an occupied spectrum, of a transmit end and a receive end of the current OTSiA#i. | This field is specific to the OTSiA OH. |

TABLE 7-continued

Description of fields included in the schematic diagram of the structure in FIG. 11

| Name and size of a field | Description | Remarks |
| --- | --- | --- |
| | Specifically, if one OTSiA OH code block unit may include all information, information indication is completed without using an MFASi field; otherwise, similar to the TTI field, this field needs to use an MFASi field to completely indicate TSI information in a multi-frame manner. | |
| CRC8 | For a description, refer to Table 5, and details are not described herein. | This field is common to the two overheads. |

It should be noted that, in the example in FIG. 11, one overhead code block unit indicates, using two fields (BU_TYPE and OTSiA_Type) together, an overhead type of an overhead born by the overhead code block unit. As shown in Table 3, different code block unit type fields may be used to indicate the OTSiA OH and the OCh OH. To be more specific, BU_TYPE=0x03 indicates the OTSiA OH, and BU_TYPE=0x04 indicates the OCh OH.

Optionally, when a location of an overhead code block unit included in an OSC frame may change, to be more specific, various overhead code block units are added to a payload area of the OSC frame in a floating mapping manner, a floating mapping indication field (also referred to as floating mapping indication information) may be added to an overhead area of the OSC frame. The information is used to indicate a specific location of an overhead code block unit in the payload area and an overhead type of an overhead born by the overhead code block unit. For example, <BU_TYPE, X> is used to represent the floating mapping indication information, where BU_TYPE indicates a type of the overhead code block unit, and X indicates that the code block unit starts from the $X^{th}$ code block in the payload area of the OSC frame. Alternatively, <BU_TYPE, OTSiA_Type, X> may be further used to represent the floating mapping indication information. A specific representation form of the floating mapping indication information and a location of the floating mapping indication information in the OSC frame are not limited in the present disclosure.

The following further describes the floating mapping indication information with reference to FIG. 12. It should be noted that, in FIG. 12, a MAP field is the floating mapping indication information described in the previous paragraph.

In the example of the structure shown in FIG. 12, the floating mapping indication information is placed in the overhead area of the OSC frame. Because overhead types and a quantity of overheads included in the OSC frame are variable, a length of the floating mapping indication information is also variable. Generally, the length of the floating mapping indication information is an integer multiple of a size of a 66B code block. To be more specific, a size is y x 66B, where y is a positive integer. In addition, because a payload area of each OSC frame (for example, the $i^{th}$ frame and the $(i+1)^{th}$ frame shown in FIG. 12) may include different information, the $i^{th}$ frame and the $(i+1)^{th}$ frame may have different floating mapping indication information. A specific format and the location of the floating mapping indication information in the OSC frame are not specifically limited in this embodiment of the present disclosure.

Optionally, before a network device sends an OSC frame, forward error correction (FEC) information may be added to support a network device that receives the OSC frame in automatically correcting an error that occurs during transmission.

In a possible implementation, for example, an RS (514, 544) (an FEC encoding manner) is added to the OSC frame shown in FIG. 2, and processing steps of adding FEC to the OSC frame are as follows.

Step 1: Perform encoding conversion. To be more specific, perform conversion from four 66B code blocks to one 257B code block for the OSC frame shown in FIG. 2.

An AM code block in the OSC frame is compressed. For example, a synchronization header (a SyncHD field) included in the AM block is compressed, four pieces of 2-bit information "10" are compressed into one piece of 1-bit information "1", and another part remains unchanged. Similar processing is performed on an OH code block.

There are two possible processing manners for a 66B code block included in a payload area. When four consecutive 66B code blocks are all data code blocks (namely, non-idle code blocks or overhead code block units that bear overheads), four 2-bit synchronization headers "01" are compressed into one piece of 1-bit information "0", and other information remains unchanged. When an idle code block is included in four consecutive 66B code blocks, there are four possible permutations when one idle code block is included: (an idle code block, a data code block, a data code block, and a data code block), (a data code block, an idle code block, a data code block, and a data code block), (a data code block, a data code block, an idle code block, a data code block) and (a data code block, a data code block, a data code block, and an idle code block). Similarly, there are six possible permutations when two idle code blocks are included, there are four possible permutations when three idle code blocks are included, and there is one possible permutation when four idle code blocks are included. There are 15 possible permutations in total. In this case, a processing manner is as follows.

Step A: Compress four 2-bit synchronization headers "01" or "10" into one piece of 1-bit information "1".

Step B: Use 7 bits in the last idle code block to indicate location information of the included idle code block (indicating which one of the foregoing 15 possible permutations is a permutation of the current four code blocks), such that when the information is received, original code block information may be restored. In other words, inverse processing of the encoding conversion may be performed.

It should be noted that, a length value of the foregoing 7 bits is merely an example. In addition, step A and step B may be performed in an order of AB or BA, or may be alternately performed for encoding processing according to a specific requirement.

Step 2: Perform FEC encoding. To be more specific, perform the FEC encoding on information obtained after conversion processing.

Figure 13:
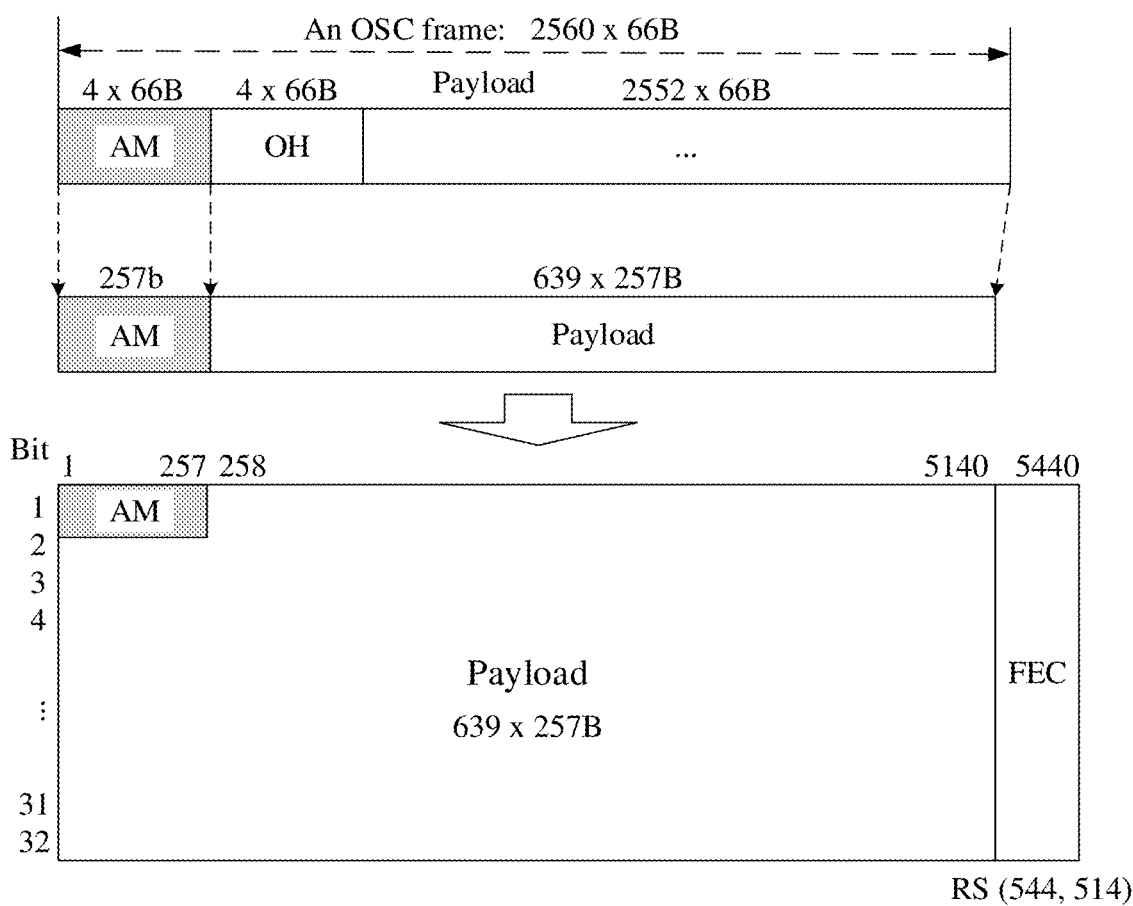
FIG. 13 is a schematic diagram of a possible structure to which FEC is added.

Starting from the AM code block of the OSC frame, FEC encoding is performed every twenty 257B data blocks. 300-bit FEC information (namely, an RS (514, 544) code word) is generated and added to a tail of this group of 257B data blocks, which is shown in FIG. 13. It can be seen from FIG. 13 that, 32 RS (514, 544) code words may exactly be generated for one OSC frame whose length is 2560×66B.

It should be noted that, FIG. 13 is a schematic diagram of a structure in the foregoing steps. In addition, in this manner of adding FEC information, a location of the RS (514, 544) code word may be identified using fixed pattern information included in the AM code block of the OSC frame.

In another possible implementation, one OSC frame without FEC information is mapped to another OSC frame format in a bit synchronous mapping manner, and the other OSC format includes an FEC field, such that corresponding FEC information may be added. It should be noted that, when mapping of different frames is performed, some padding information may need to be inserted to perform a rate adaptation function.

In still another possible implementation, one OSC frame without FEC information is mapped to another OSC frame format through a bit-synchronous generic mapping procedure (BGMP), and the other OSC format includes an FEC field, such that corresponding FEC information may be added. It should be noted that, when mapping of different frames is performed, some padding information may need to be inserted to perform a rate adaptation function.

It should be noted that a difference between the second manner and the third manner lies in that different mapping methods are used. In this embodiment of the present disclosure, an OSC frame format with FEC and a used FEC encoding manner are not limited.

It should be noted that, whether to place a specified overhead code block unit at any idle location in a payload area of an OSC frame in a floating mapping manner or at a fixed location in a payload area of an OSC frame needs to be determined based on a specific requirement. A specific mapping manner is not limited in this embodiment of the present disclosure. Floating mapping means that an overhead code block unit is mapped to any idle location in a payload area of one OSC frame. Fixed mapping means that an overhead code block unit is mapped to a preset location in a payload area of one OSC frame. Generally, all OTN devices need to process an OTS OH and an OMS OH. Therefore, it may be set that the OTS OH and the OMS OH are placed at a fixed location in an OSC frame while other overheads (for example, an OTSiA OH, an OMS_DCC, and an OCh OH) are mapped to the OSC frame in a floating mapping manner. This floating mapping manner or a hybrid mapping manner provides some flexibility, has good expansibility, and can well meet a requirement of a future large-scale network for an OSC.

The following further describes the embodiments of the present disclosure in detail based on a commonality of the foregoing OSC frame formats in the present disclosure.

Embodiment 1

An embodiment of the present disclosure provides an overhead processing method, apparatus, and system in an optical network. For a service, three types of nodes (or network devices) need to process an OSC frame. A first type is a first node, and a node of this type is a start node of the service. To be more specific, transmission of a client service starts from this node in the network. A second type is a last node, and a node of this type is a destination node of the service. To be more specific, transmission of the client service ends at this node. A third type is an intermediate node, and a major function of a node of this type is to forward the service. For example, nodes of this type may be the OLA and the ROADM shown in FIG. 1. It should be noted that, devices of different types need to perform processing/an operation on different overheads based on different specific functions.

In a possible networking structure, a network includes only a node of the first type and a node of the second type, namely, a first node and a last node. In this network, a procedure in which different nodes process an OSC frame is described as follows.

Figure 14:
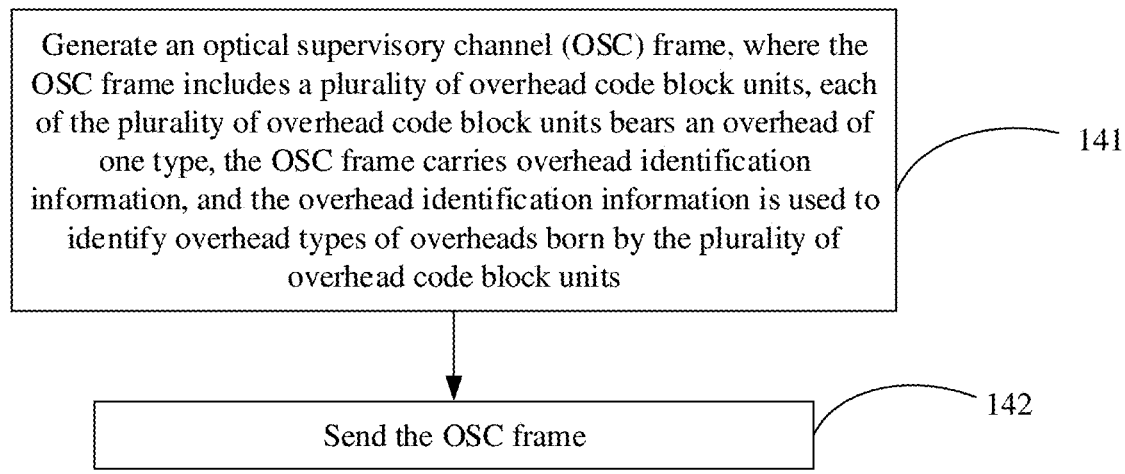
FIG. 14 is a flowchart of processing an OSC frame by a possible network device.

As shown in FIG. 14, a procedure in which the first node processes one OSC frame is described as follows.

In part 141, an optical supervisory channel (OSC) frame is generated, where the OSC frame includes a plurality of overhead code block units, each of the plurality of overhead code block units bears an overhead of one type, the OSC frame carries overhead identification information, and the overhead identification information is used to identify overhead types of overheads born by the plurality of overhead code block units.

It should be noted that, the overheads may include the overheads listed in Table 3. For example, the overheads include an OTS OH, an OMS OH, and an OTSiA OH. Optionally, the overheads may further include an OCh OH, an OTS_DCC, and the like. For a description of each overhead, refer to Table 3, and details are not described herein. It should be further noted that, there may be one or more OTSiA OHs and one or more OCh OHs. Different overheads are encapsulated in different overhead code block units. For example, each overhead is born by a single overhead code block unit.

The generating an OSC frame includes the following steps.

Step 1: Respectively encapsulate a plurality of overheads in the plurality of overhead code block units.

Step 2: Map the plurality of overhead code block units to a payload area of the OSC frame.

Step 3: Generate an OSC frame overhead, and add the OSC frame overhead to an overhead area of the OSC frame.

It should be noted that, the foregoing first two steps may be performed in any order, and this is not limited in the present disclosure.

The OSC frame overhead includes an OSC frame overhead code block and an OSC frame alignment marker code block. The OSC frame overhead code block is used to carry operation, administration, and maintenance information of the OSC frame, and the OSC frame alignment marker code block is used to identify the OSC frame. Generally, a rate of the OSC frame does not necessarily match rates of the overhead code block units mapped to the OSC frame. Optionally, in a process of mapping the overhead code block units to the payload area of the OSC frame, rate adaptation may need to be performed using an idle code block.

It should be noted that, there are a plurality of manners of mapping an overhead code block unit to the OSC frame. For example, the plurality of manners may include a floating mapping manner. For another example, the plurality of manners may include a hybrid floating-fixed mapping manner. To be more specific, a plurality of overhead code block units may be all mapped to one OSC frame in the floating mapping manner, or may be mapped to one OSC frame in the hybrid floating-fixed mapping manner. For descriptions of different mapping manners, refer to the general overview part, and details are not described herein.

The overhead identification information needs to be used to differentiate an overhead type of the overhead born by each of the plurality of overhead code block units. In a possible implementation, the overhead identification information is corresponding to the foregoing MAP field. For a description and location information of the overhead identification information in the OSC frame, refer to the related descriptions in the general overview part, and details are not described herein. In another possible implementation, the overhead identification information is corresponding to one or more code block unit type fields. For a description and a specific location of the information in the OSC frame, refer to the related descriptions in the general overview part, and details are not described herein. For example, different BU_TYPE values are assigned for different overheads. As shown in Table 3, if an OTS OH is placed in a code block unit, BU_TYPE is set to 1. Similarly, if an OMS OH is placed in a code block unit, BU_TYPE is set to 2. It should be noted that, a difference between the OTS OH and the OMS OH lies in that the OTS OH is placed in an overhead area of an OSC frame while the OMS OH is placed in a payload area of the OSC frame. By parsing this field, a location of an overhead code block unit included in the payload area of the OSC frame may be learned, and overhead type information of an overhead born by the overhead code block unit may also be learned. This field is placed in one overhead code block unit, and indicates an overhead type of an overhead born by the overhead code block unit. In addition, an overhead type of an overhead born by one overhead code block unit may be further determined using location information. For example, as described in the general overview part, an OTS OH is placed at a fixed location of one OSC frame.

In part 142, the first node sends the OSC frame.

For example, the first node sends the OSC frame to another network device, for example, a downstream node adjacent to the first node such as the last node.

It should be noted that, after adding the OSC frame overhead to the overhead area of the OSC frame (or before the step of sending the OSC frame), the first node may further need to add forward error correction (FEC) information to the OSC frame. For an operation manner, refer to the three manners described in the general overview part, and details are not described herein.

Figure 15:
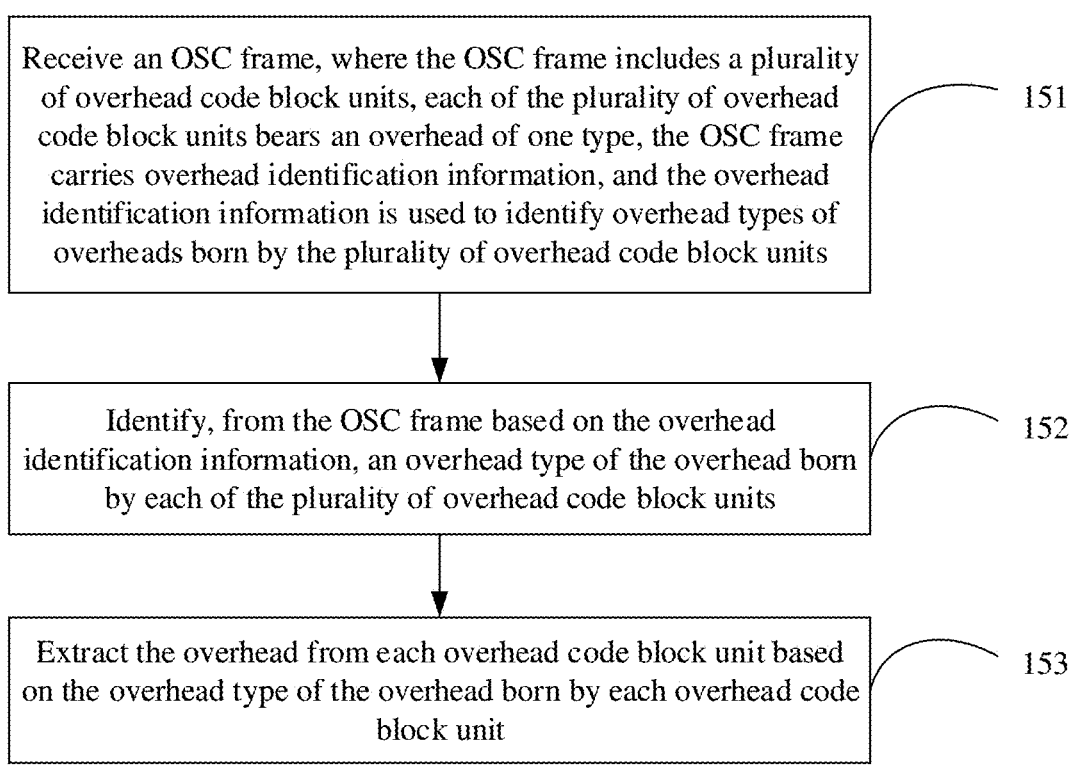
FIG. 15 is a flowchart of processing an OSC frame by another possible network device.

As shown in FIG. 15, a procedure in which the last node processes one OSC frame is described as follows.

In part 151, the last node receives the OSC frame, where the OSC frame includes a plurality of overhead code block units, each of the plurality of overhead code block units bears an overhead of one type, the OSC frame carries overhead identification information, and the overhead identification information is used to identify overhead types of overheads born by the plurality of overhead code block units.

For example, the last node receives the OSC frame sent by a first node. The last node identifies a start location of one OSC frame by discovering an OSC frame alignment marker code block, to perform a subsequent parsing operation. The overheads of a plurality of types include an OTS OH, an OMS OH, and an OTSiA OH. Optionally, the plurality of overheads further include one or more of an OCh OH, an OMS_DCC, or an OTS_DCC. It should be noted that, the last node may further receive an OSC frame from an intermediate node.

For location information and a description of the overhead identification information, refer to the foregoing description of step 141 in FIG. 14, and details are not described herein. It should be noted that, the information enables the node that receives the OSC frame to quickly identify an overhead code block unit that needs to be parsed by the node.

In part 152, the last node identifies, from the OSC frame based on the overhead identification information, an overhead type of the overhead born by each of the plurality of overhead code block units.

For example, the plurality of overhead code block units include at least an OTS OH code block unit, an OMS OH code block unit, and an OTSiA OH code block unit. Optionally, the plurality of overhead code block units may further include one or more of an OCh OH code block unit, an OTS_DCC code block unit, or an OMS_DCC code block unit. Optionally, this step may further include deleting an idle code block. In addition, optionally, if a received OSC frame includes FEC information, the last node further needs to perform FEC check on the received OSC frame.

In a possible implementation, different overhead code block units may be differentiated using a code block unit type indication field (for example, BU_TYPE). If one BU_TYPE type is used to indicate overheads of two types, other information further needs to be used to identify a specific included overhead type. The overhead structure shown in FIG. 11 is used as an example. If BU_TYPE=3 is used to indicate an OTSiA OH and an OCh OH, an OTSiA_Type field needs to be used to differentiate a specifically indicated type. In addition, a plurality of OTSiA OHs are usually included. Therefore, one field further needs to be used to differentiate an OTSiA OH indicated by a currently identified overhead code block unit. As described in FIG. 11 and Table 7, TPID may be used to differentiate specific numbers of OTSiA OHs. In another possible implementation, overhead types of overheads included in different overhead code block units may be further identified using floating mapping indication information (for example, the MAP field in FIG. 12). In still another possible implementation, different overhead code block units may be identified using a fixed location. For example, if the OTS OH and the OMS OH are fixed as the first and second code blocks and the third and fourth code blocks respectively, after receiving the OSC frame, the node may identify different overhead code block units by identifying location information.

In part 153, the last node extracts the overhead from each overhead code block unit based on the overhead type of the overhead born by each overhead code block unit.

A corresponding overhead is extracted from a corresponding overhead code block unit. For example, an OTS OH is extracted from an OTS OH code block unit. An OTSiA OH or an OCh OH is extracted from an OTSiA OH code block unit or an OCh OH code block unit. OAM processing is performed based on a value of a specific field included in an overhead that is obtained through parsing. For example, it may be determined, using a PMI field in the OTS OH, whether loss occurs in received service data. For more fields and descriptions of the fields, refer to the descriptions in the related tables in the general overview part, and details are not described herein.

It should be noted that, the last node further needs to extract OSC frame overhead information, to monitor and manage the OSC frame. For example, a corresponding field of an OSC frame overhead is extracted to determine whether bit errors and the like exist in an OSC frame during transmission.

According to the overhead processing method described in this embodiment of the present disclosure, a node may flexibly transmit a plurality of types of overhead information of an OTN. The overhead processing method is flexible, and bandwidth utilization is improved. In addition, a flexible mapping manner is used in the method, and the mapping manner has good compatibility and expansibility, and can meet a requirement of a future large-scale network for an OSC.

Embodiment 2

An embodiment of the present disclosure provides another overhead processing method, apparatus, and system in an optical network. In another possible networking structure, in addition to a first node and a last node, an intermediate device such as an OLA, that can process some overheads may further be included. An OLA network device is a network device of a transmission section. To be more specific, the device is an end of a transmission section between the device and a previous node, and is a start of a transmission section between the device and a next node. Therefore, the device needs to process overheads related to the transmission sections.

Figure 16:
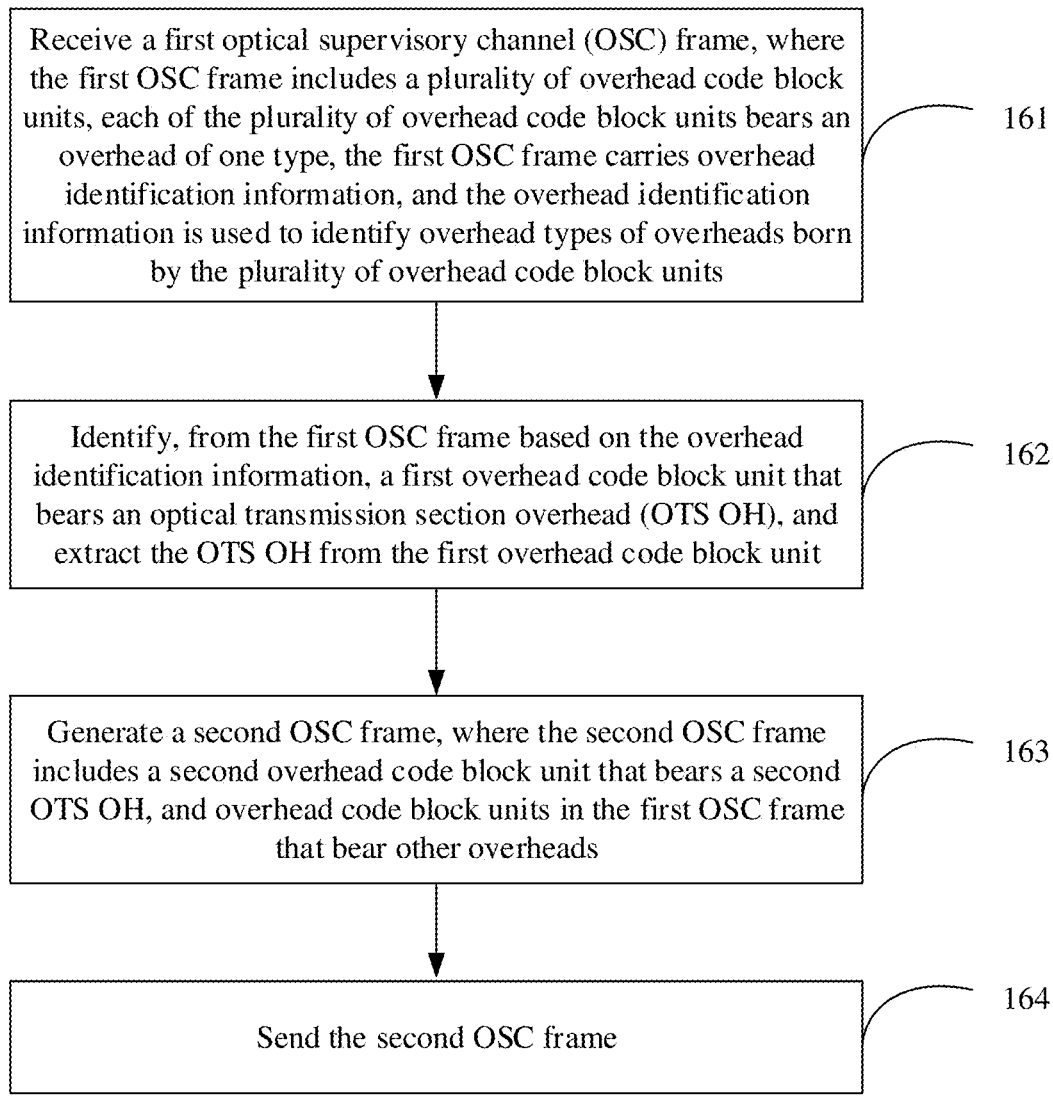
FIG. 16 is a flowchart of processing an OSC frame by still another possible network device.

Behaviors of the first node and the last node are the same as those described in Embodiment 1, and details are not described herein. The following mainly describes a behavior of the intermediate device (for example, the OLA). As shown in FIG. 16, a procedure in which the OLA processes an OSC frame is described as follows.

In part 161, the intermediate node receives a first optical supervisory channel (OSC) frame, where the first OSC frame includes a plurality of overhead code block units, each of the plurality of overhead code block units bears an overhead of one type, the first OSC frame carries overhead identification information, and the overhead identification information is used to identify overhead types of overheads born by the plurality of overhead code block units.

For example, the intermediate node receives the OSC frame from a node that is upstream of the intermediate node. The upstream node may be a first node device or an intermediate node device. The overheads include an OTS OH, an OMS OH, and an OTSiA OH. Optionally, the overheads further include one or more of an OCh OH, an OMS_DCC, or an OTS_DCC. For a manner in which the plurality of overhead code block units are mapped to the first OSC frame and descriptions of the overhead identification information, refer to the related descriptions of part 141 in FIG. 14, and details are not described herein.

In part 162, the intermediate node identifies, from the first OSC frame based on the overhead identification information, a first overhead code block unit that bears the optical transmission section overhead (OTS OH), and extracts the OTS OH from the first overhead code block unit.

For example, an intermediate device determines, based on the overhead identification information, an overhead code block unit that needs to be parsed. In this embodiment, the intermediate device is a device of a transmission section. Therefore, the intermediate device needs to obtain, through parsing, a transmission section overhead included in the received first OSC frame. For a manner of determining an overhead type of an overhead born by one overhead code block unit, refer to the related descriptions of part 141 in FIG. 14 in Embodiment 1, and details are not described herein. After determining the overhead code block unit that needs to be parsed, the intermediate device parses the overhead code block unit according to a preset format, for example, any one frame format described in the general overview part.

In part 163, the intermediate node generates a second OSC frame, where the second OSC frame includes a second overhead code block unit that bears a second OTS OH, and overhead code block units in the first OSC frame that bear other overheads.

For example, this step includes: generate the second OTS OH and encapsulate the second OTS OH in the second overhead code block unit, where the OTS OH is used to perform an OAM operation on a next transmission section; map the second overhead code block unit and the overhead code block units in the first OSC frame that bear the other overheads to a payload area of the second OSC frame; and generate an OSC frame overhead, and adds the OSC frame overhead to an overhead area of the second OSC frame.

It should be noted that, the first step and the second step may be performed in any order, and this is not limited in the present disclosure. Optionally, if an OSC frame includes FEC information, the intermediate node further needs to perform FEC check on the OSC frame that is received.

For example, the overhead code block units that bear the other overheads include overhead code block units that bear the OMS OH and the OTSiA OH. The overhead code block units that bear the other overheads may further include overhead code block units that bear the OCh OH, the OMS DCC, and the like. The intermediate node does not need to process the overheads, and therefore may directly map the overheads from the first OSC frame to the second OSC frame. It should be noted that, directly mapping means that the intermediate node does not need to further parse the overhead code block units, and directly performs mapping. In this way, processing efficiency is improved, and a delay caused by the intermediate node processing an OSC frame is also relatively low compared with other approaches.

It should be noted that, a method that may be used for the mapping step described in part 163 is the same as the method described in part 141 in FIG. 14, and details are not described herein.

In part 164, the intermediate node sends the second OSC frame.

The intermediate node sends an OSC frame to a node that is downstream of the intermediate node, for example, the last node.

It should be noted that, in an OTN that includes an intermediate device such as an OLA, a last node receives an OSC frame from a node, for example, the OLA in this embodiment, that is upstream of the last node. It should be further noted that the intermediate node in this embodiment may further need to process the OTS_DCC. A processing method is similar to the foregoing method for processing an OTS overhead, and details are not described herein.

It should be further noted that, the intermediate node needs to extract an OSC frame overhead code block included in an OSC frame, to monitor and manage the OSC frame. For example, the intermediate node determines whether bit errors exist in the OSC frame during transmission.

According to the overhead processing method described in this embodiment of the present disclosure, a plurality of types of overhead information of the OTN are flexibly transmitted, such that a node that receives an OSC frame only needs to extract and process an overhead that the node needs, and transparently transmits another overhead, thereby accelerating processing. In addition, this OSC frame format is flexible, has high bandwidth utilization and good compatibility and expansibility, and can meet a requirement of a future large-scale network for an OSC.

Embodiment 3

An embodiment of the present disclosure provides still another overhead processing method, apparatus, and system in an optical network. In a possible networking structure, in addition to a first node and a last node, an intermediate device that processes some overheads may further be included. For example, an ROADM network device is a network device of a multiplex section. To be more specific, the device is an end of a transmission section or a multiplex section between the device and a previous node, and is a start of a transmission section or a multiplex section between the device and a next node. Therefore, the device needs to process overheads related to the transmission section and the multiplex section. It should be noted that, a difference between this embodiment and Embodiment 2 lies in that overhead code block units to be processed by an intermediate node are different.

Figure 17:
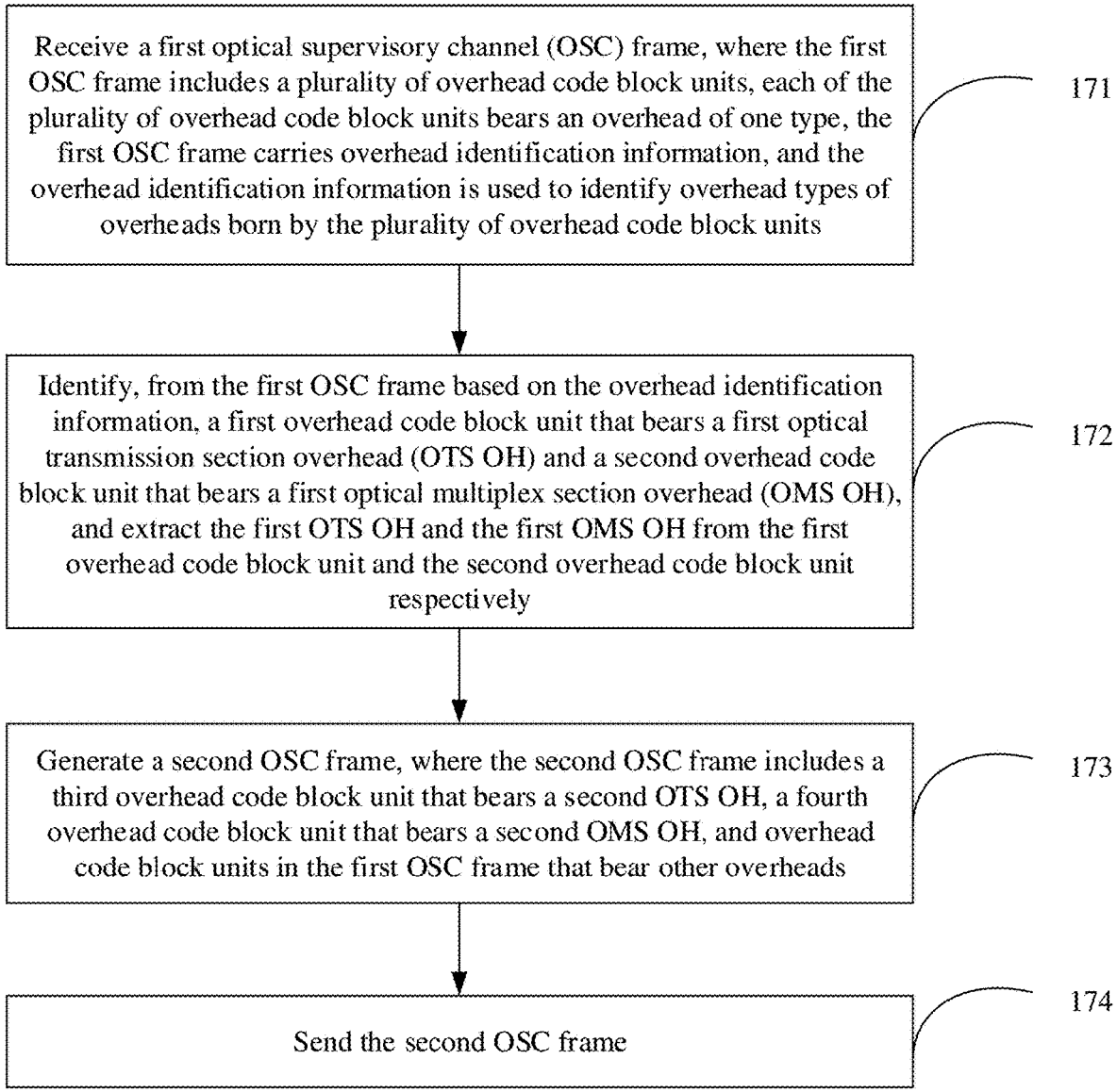
FIG. 17 is a flowchart of processing an OSC frame by yet another possible network device.

Behaviors of the first node and the last node are the same as those described in Embodiment 1, and details are not described herein. The following mainly describes a behavior of an intermediate device ROADM. As shown in FIG. 17, a procedure in which the intermediate node processes an OSC frame in this embodiment is similar to the processing procedure of the intermediate node described in Embodiment 2, and details are not described herein. A main difference lies in part 162 and part 163, and descriptions are as follows.

For part 162, in addition to processing an OTS OH code block unit, the intermediate node in this embodiment further needs to perform a similar operation on an OMS OH. To be more specific, the intermediate node needs to identify a second overhead code block unit that bears the optical multiplex section overhead, and extract the optical multiplex section overhead from the second overhead code block unit.

For part 163, in addition to generating a second OTS OH and encapsulating the second OTS OH in a third overhead code block unit, the intermediate node in this embodiment further needs to perform a similar operation on an OMS OH. To be more specific, the intermediate node needs to generate a new OMS OH and encapsulate the new OMS OH in a fourth overhead code block unit. It should be noted that, the generated new OMS OH is used to perform an OAM operation on a next multiplex section. In addition, in this embodiment, the third overhead code block unit and the fourth overhead code block unit that are mentioned above and another overhead code block unit that does not need to be processed need to be mapped to a payload area of a second OSC frame. In this embodiment, overhead code block unit that does not need to be processed refers to overhead code block units except those overhead code block units that bear an OTS OH and an OMS OH.

It should be noted that, when processing an overhead code block unit that bears an OTSiA OH/OCh OH, the intermediate node in this embodiment needs to determine, based on cross-connection configuration information, a payload area of a new OSC frame to which the overhead that is received should be mapped. The cross-connection configuration information may be manually configured, or may be automatically delivered when end-to-end configuration is performed on a network management system, or may be automatically configured when rerouting is performed using a control plane of a device to create a path. FIG. 1 is used as an example. The device 1 has two OTSiA OHs. A last node for one OTSiA OH is the device 2, but a last node for the other OTSiA OH is not the device 2. Therefore, after receiving an OSC frame that includes overhead code block units bearing an OTSiA # i OH and an OTSiA # j OH, the intermediate node ROADM 1 needs to place the two overhead code block units in different OSC frames respectively. For example, the intermediate node ROADM 1 maps the overhead code block unit that bears the OTSiA # i OH into an OSC frame to be sent to the OA device between the ROADM 1 and the ROADM 2, and directly maps the other OTSiA OH code block unit, namely, the overhead code block unit that bears the OTSiA # j OH, into an OSC frame that is to be sent to the other last node.

It should be further noted that, optionally, the intermediate node described in this embodiment further needs to process overheads related to an OMS_DCC. To be more specific, the intermediate node terminates an OMS_DCC received by the intermediate node and generates an OMS_DCC for a next multiplex section.

A plurality of types of overhead information of an OTN are flexibly transmitted using the OSC frame format described in the embodiments of the present disclosure, such that a node that receives an OSC frame only needs to extract and process an overhead that the node needs, and transparently transmits another overhead, thereby accelerating processing. In addition, this OSC frame format is flexible, has high bandwidth utilization and good compatibility and expansibility, and can meet a requirement of a future large-scale network for an OSC.

It should be noted that, as described in Embodiment 1 to Embodiment 3, an overhead code block unit may be mapped to a payload area of an OSC frame in a floating mapping manner or in a hybrid of two manners. For a mapping manner, refer to the descriptions in the general overview part, and details are not described herein.

It should be further noted that, according to a specific application requirement, one of the plurality of OSC frame structures described in the general overview part may be used for the OSC frames used by the network devices (the first node, the last node, and the intermediate node) described in Embodiment 1 to Embodiment 3. Details about the OSC frame structure are not described in the procedure descriptions in Embodiment 1 to Embodiment 3, and only a related field or related information is mentioned when needed.

Embodiment 4

Figure 18:
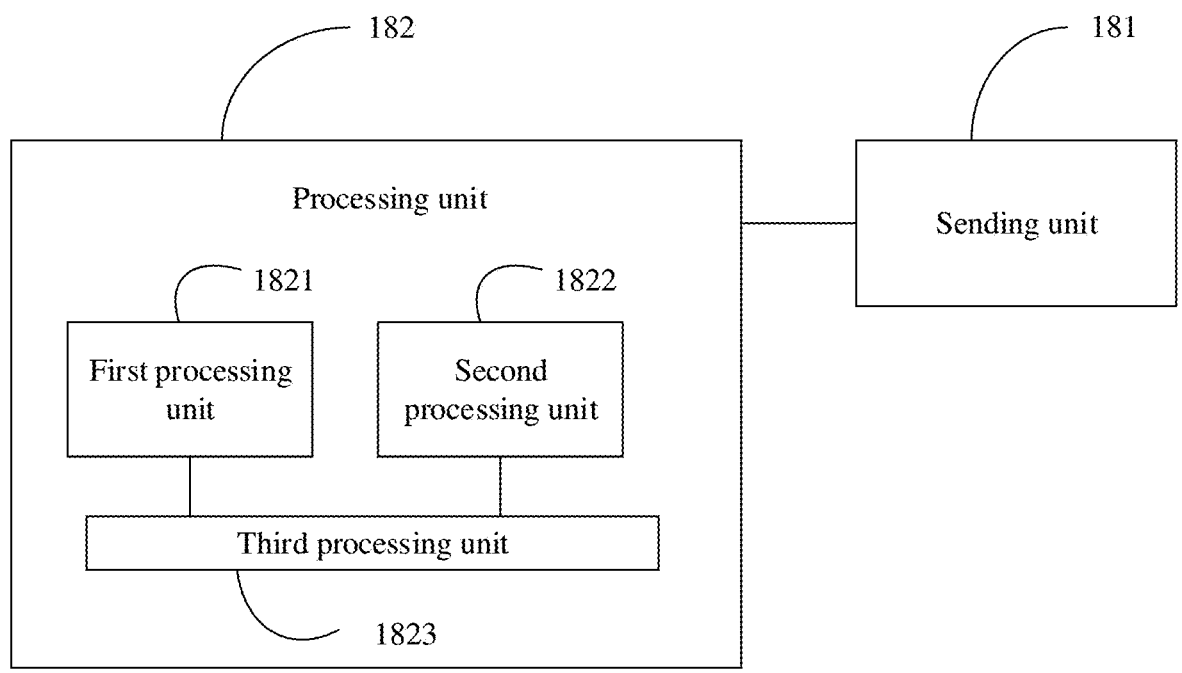
FIG. 18 is a schematic diagram of a structure of a possible network device.

FIG. 18 is a schematic diagram of a structure of a possible network device. For example, the schematic diagram is a schematic diagram of a possible structure of the first node in the foregoing method embodiments. The first node includes a sending unit 181 and a processing unit 182.

The processing unit 182 is configured to construct an OSC frame. For example, the processing unit 182 is configured to perform the actions described in part 141 in FIG. 14.

The sending unit 181 is configured to send the OSC frame constructed by the processing unit 182 to another network device (for example, a downstream network device). That is, the sending unit 181 is configured to perform the action described in part 142 in FIG. 14.

In a possible implementation, the processing unit 182 further includes a first processing unit 1821, a second processing unit 1822, and a third processing unit 1823. The first processing unit 1821 is configured to construct an overhead code block unit. The second processing unit 1822 is configured to construct an OSC frame overhead. The third processing unit 1823 is configured to map objects constructed by the first processing unit 1821 and the second processing unit 1822 to the OSC frame.

In another possible implementation, the processing unit further 181 includes a first processing unit, a second processing unit, a third processing unit, and a fourth processing unit. Functions of the first processing unit, the second processing unit, and the third processing unit are the same as those in the previous implementation, and details are not described herein. The fourth processing unit is configured to add FEC information to the OSC frame. For an operation manner, refer to the first three examples in this specification, and details are not described herein.

Figure 19:
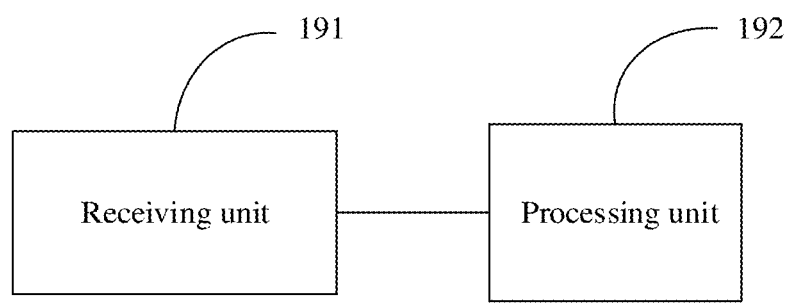
FIG. 19 is a schematic diagram of a structure of another possible network device.

FIG. 19 is a schematic diagram of a structure of another possible network device. For example, the schematic diagram is a schematic diagram of a possible structure of the last node in the foregoing method embodiments. The last node includes a receiving unit 191 and a processing unit 192.

The receiving unit 191 is configured to receive an OSC frame from another network device (for example, an upstream node adjacent to the last node).

The processing unit 192 is configured to parse the OSC frame received by the receiving unit 191. For example, the processing unit 192 is configured to perform step 152 to step 153 in FIG. 15.

Figure 20:
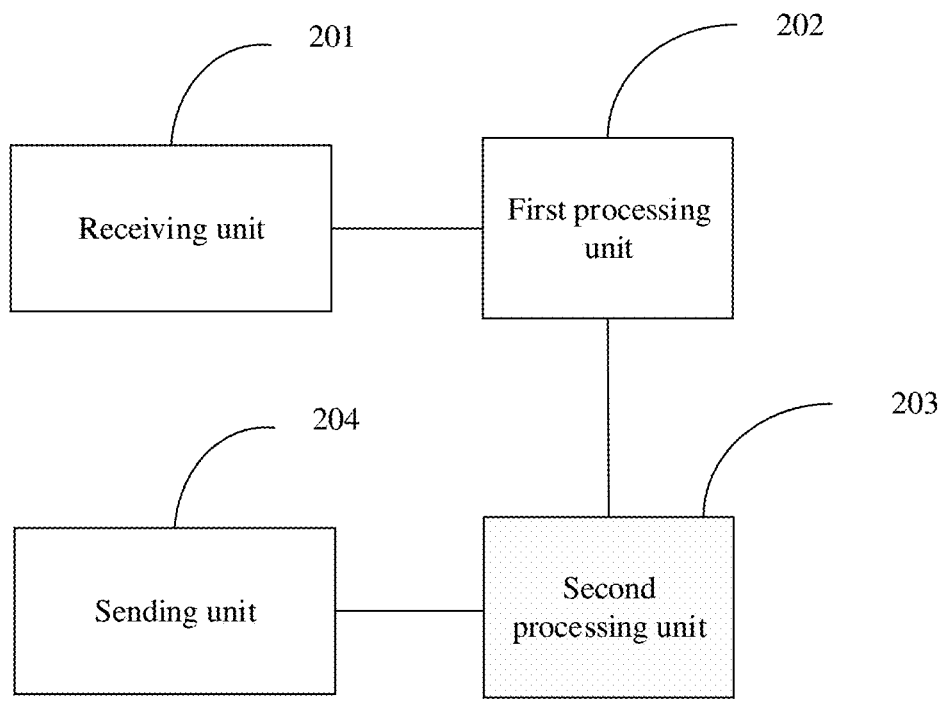
FIG. 20 is a schematic structural diagram of a structure of still another possible network device.

FIG. 20 is a schematic diagram of a structure of still another possible network device. For example, the schematic diagram is a schematic diagram of a possible structure of the intermediate node in the foregoing method embodiments. The intermediate node includes a receiving unit 201, a first processing unit 202, a second processing unit 203, and a sending unit 204.

In a possible implementation, the receiving unit 201 is configured to receive an OSC frame from another network device (for example, an upstream node adjacent to the intermediate node). For example, the receiving unit 201 performs the operation of receiving an OSC frame in step 161 in FIG. 16. The first processing unit 202 is configured to parse the OSC frame received by the receiving unit 201. For example, the first processing unit 202 performs the parsing operation in step 162 shown in FIG. 16. The second processing unit 203 is configured to construct a new OSC frame. For example, the second processing unit 203 performs step 163 shown in FIG. 16. The sending unit 204 is configured to send the new OSC frame constructed by the second processing unit 203. For example, the sending unit 204 performs step 164 shown in FIG. 16.

In another possible implementation, the receiving unit 201 is configured to receive an OSC frame from another network device (for example, an upstream node adjacent to the intermediate node). For example, the receiving unit 201 performs the operation of receiving an OSC frame in step 171 in FIG. 17. The first processing unit 202 is configured to parse the OSC frame received by the receiving unit. For example, the first processing unit 202 performs the parsing operation in step 172 shown in FIG. 17. The second processing unit is configured to construct a new OSC frame. For example, the second processing unit 203 performs the action described in step 173 shown in FIG. 17. The sending unit 204 is configured to send the new OSC frame constructed by the second processing unit. For example, the sending unit 204 performs step 174 shown in FIG. 17.

It should be noted that, the first processing unit and the second processing unit may be combined into one processing unit. In addition, the second processing unit may be further divided into a plurality of processing units. For example, the second processing unit may be further divided into a third processing unit and a fourth processing unit, and the third processing unit and the fourth processing unit each are configured to encapsulate a plurality of overheads in different overhead code block units, and map the overhead code block units to one OSC frame. Refer to the related descriptions of generating an OSC frame in Embodiment 2 to Embodiment 3, and details are not described herein. It should be further noted that, the processing unit, the sending unit, and the receiving unit described above may be a processor, a transmitter, and a receiver respectively.

Persons of ordinary skill in the art may understand that all or some of the steps of the embodiments may be implemented by hardware or a program instructing related hardware. The program may be stored in a computer readable storage medium. The foregoing storage medium may be a read-only memory, a magnetic disk, an optical disc, or the like. For example, the foregoing processing unit or processor may be a central processing unit, a general-purpose processor, a digital signal processor (DSP), an application-specific integrated circuit (ASIC), a field programmable gate array (FPGA) or another programmable logical device, a transistor logical device, a hardware component, or any combination thereof. Whether the functions are performed by hardware or software depends on particular applications and design constraint conditions of the technical solutions. Persons skilled in the art may use different methods to implement the described functions for each particular application, but it should not be considered that such implementation goes beyond the scope of the present disclosure.

Finally, it should be noted that the foregoing embodiments are merely intended for describing the technical solutions of the present disclosure, but not for limiting the present disclosure. Although the present disclosure is described in detail with reference to the foregoing embodiments, the persons of ordinary skill in the art should understand that they may still make modifications to the technical solutions described in the foregoing embodiments or make equivalent replacements to some or all technical features thereof. Therefore, the protection scope of the present disclosure shall be subject to the protection scope of the claims.

What is claimed is:

1. An overhead processing method in an optical transport network, wherein the method comprises:
    generating an optical supervisory channel (OSC) frame, wherein the OSC frame comprises overhead code block units, wherein each of the overhead code block units bears an overhead of one of a plurality of overhead types, wherein the OSC frame carries overhead identification information, wherein the overhead identification information identifies the overhead type of the overhead born by each of overhead code block units, and wherein overheads of the plurality of overhead types comprise an optical transmission section (OTS) overhead (OH), an optical multiplex section OH (OMS OH), and an optical tributary signal assembly OH (OTSiA OH); and
    sending the OSC frame.

2. The overhead processing method according to claim 1, wherein the OSC frame comprises an overhead area and a payload area, and wherein the overhead code block units are located in the payload area of the OSC frame.

3. The overhead processing method according to claim 2, wherein the overhead identification information is located in the overhead area of the OSC frame, and wherein the overhead identification information comprises location information of at least one of the overhead code block units in the payload area and overhead type information of an overhead born by the at least one overhead code block unit.

4. The overhead processing method according to claim 1, wherein the overhead identification information is located in at least one of the overhead code block units, and wherein the overhead identification information indicates an overhead type of an overhead born by each of the least one overhead code block unit.

5. The overhead processing method according to claim 1, wherein generating an OSC frame comprises:
encapsulating the OTS OH, the OMS OH, and the OTSiA OH in the overhead code block units; and
mapping the overhead code block units to a payload area of the OSC frame.

6. The overhead processing method according to claim 5, wherein mapping the overhead code block units to the payload area of the OSC frame comprises:
mapping some of the overhead code block units to a preset location in the payload area of the OSC frame; and
mapping the other overhead code block units to any idle location in the payload area of the OSC frame.

7. The overhead processing method according to claim 5, wherein mapping the overhead code block units to the payload area of the OSC frame comprises mapping the overhead code block units to any idle location in the payload area of the OSC frame.

8. The overhead processing method according to claim 1, wherein each of the overhead code block units comprises at least two 66B data code blocks.

9. A network device in an optical network, wherein the network device comprises:
a processor configured to generate an optical supervisory channel (OSC) frame, wherein the OSC frame comprises overhead code block units, wherein each of the overhead code block units bears an overhead of one of a plurality of overhead types, wherein the OSC frame carries overhead identification information, wherein the overhead identification information identifies the overhead type of the overhead born by each of the overhead code block units, and wherein overheads of the overhead types comprise an optical transmission section (OTS) overhead (OH), an optical multiplex section OH (OMS OH), and an optical tributary signal assembly OH (OTSiA OH); and
a transmitter coupled to the processor and configured to send the OSC frame.

10. The network device according to claim 9, wherein the OSC frame comprises an overhead area and a payload area, wherein the overhead code block units are located in the payload area of the OSC frame, and wherein the overhead identification information is located in the overhead area of the OSC frame.

11. The network device according to claim 10, wherein the overhead identification information comprises location information of at least one of the overhead code block units in the payload area and overhead type information of an overhead born by the at least one overhead code block unit.

12. The network device according to claim 9, wherein the overhead identification information is located in at least one of the overhead code block units, and wherein the overhead identification information is used to indicate an overhead type of an overhead born by each of the least one overhead code block unit.

13. The network device according to claim 9, wherein the processor comprises a first processor and a second processor, wherein the first processor is configured to encapsulate the OTS OH, the OMS OH, and the OTSiA OH in the plurality of overhead code block units, and wherein the second processor is configured to map the plurality of overhead code block units to a payload area of the OSC frame.

14. The network device according to claim 13, wherein the second processor maps the overhead code block units to the payload area of the OSC frame by:
mapping some of the overhead code block units to a preset location in the payload area of the OSC frame; and
mapping the other overhead code block units to any idle location in the payload area of the OSC frame.

15. The network device according to claim 13, wherein the second processor maps the overhead code block units to the payload area of the OSC frame by mapping the overhead code block units to any idle location in the payload area of the OSC frame.

16. The network device according to claim 9, wherein each of the overhead code block units comprises at least two 66B data code blocks.

17. A network device in an optical network, wherein the network device comprises:
a receiver configured to receive a first optical supervisory channel (OSC) frame, wherein the first OSC frame comprises overhead code block units, wherein each of the overhead code block units bears an overhead of one of a plurality of overhead types, wherein the first OSC frame carries overhead identification information, wherein the overhead identification information identifies the overhead type of the overhead born by each of the overhead code block units, wherein overheads of the plurality of overhead types comprise a first optical transmission section (OTS) overhead (OH), an optical multiplex section OH (OMS OH), and an optical tributary signal assembly OH (OTSiA OH), and wherein the first OTS OH implements operation, administration, and maintenance (OAM) of a transmission section between the network device and an upstream network device adjacent to the network device;
a processor configured to:
identify, from the first OSC frame based on the overhead identification information, a first overhead code block unit that bears the first OTS OH;
extract the first OTS OH from the first overhead code block unit; and
generate a second OSC frame, wherein the second OSC frame comprises a second overhead code block unit that bears a second OTS OH and overhead code block units in the first OSC frame that bear the OMS OH and the OTSiA OH, and wherein the second OTS OH implements OAM of a transmission section between the network device and a downstream network device adjacent to the network device; and
a transmitter configured to send the second OSC frame.

18. The network device according to claim 17, wherein the processor comprises a first processor and a second processor, wherein the first processor and the second processor are configured to generate the second OSC frame, wherein the first processor is configured to generate the second OTS OH and encapsulate the second OTS OH in the second overhead code block unit, and wherein the second processor is configured to map the second overhead code block unit and the overhead code block units in the first OSC frame to a payload area of the second OSC frame.

19. The network device according to claim 18, wherein the second processor maps the second overhead code block unit and the overhead code block units in the first OSC frame to the payload area of the second OSC frame by:

mapping the second overhead code block unit and some of the overhead code block units in the first OSC frame to a preset location in the payload area of the second OSC frame; and mapping the other overhead code block units to any idle location in the payload area of the second OSC frame.

20. The network device according to claim 18, wherein the second processor maps the second overhead code block unit and the overhead code block units in the first OSC frame to the payload area of the second OSC frame by mapping the second overhead code block unit and the overhead code block units in the first OSC frame to any idle location in the payload area of the second OSC frame.

* * * * *